US012652160B2

(12) United States Patent
Richarte et al.

(10) Patent No.: US 12,652,160 B2
(45) Date of Patent: Jun. 9, 2026

(54) ANONYMOUS, AUTHENTICATED AND PRIVATE SATELLITE TASKING SYSTEM

(71) Applicant: Urugus S.A., Montevideo (UY)

(72) Inventors: Gerardo Gabriel Richarte, Caba (AR); Emiliano Kargieman, Buenos Aires (AR)

(73) Assignee: Urugus S.A., Montevideo (UY)

( * ) Notice: Subject to any disclaimer, the term of this patent is extended or adjusted under 35 U.S.C. 154(b) by 239 days.

(21) Appl. No.: 18/011,725

(22) PCT Filed: Jun. 22, 2021

(86) PCT No.: PCT/US2021/038535
§ 371 (c)(1),
(2) Date: Dec. 20, 2022

(87) PCT Pub. No.: WO2021/262753
PCT Pub. Date: Dec. 30, 2021

(65) Prior Publication Data
US 2023/0231699 A1     Jul. 20, 2023

Related U.S. Application Data

(60) Provisional application No. 63/044,892, filed on Jun. 26, 2020.

(51) Int. Cl.
*H04L 9/08* (2006.01)
*H04B 7/185* (2006.01)
*H04L 9/32* (2006.01)

(52) U.S. Cl.
CPC ....... *H04L 9/0819* (2013.01); *H04B 7/18513* (2013.01); *H04B 7/18593* (2013.01); *H04L 9/0861* (2013.01); *H04L 9/321* (2013.01)

(58) Field of Classification Search
CPC ..... H04L 9/0819; H04L 9/0861; H04L 9/321; H04B 7/18513; H04B 7/18593
(Continued)

(56) References Cited

U.S. PATENT DOCUMENTS

| | | | | |
|---|---|---|---|---|
| 2015/0365824 A1* | 12/2015 | Gustafson | ............. | H04L 9/0844 |
| | | | | 380/263 |
| 2016/0056957 A1* | 2/2016 | Clarke | .................. | H04L 9/0825 |
| | | | | 380/285 |
| 2019/0028394 A1* | 1/2019 | Coleman | ............... | H04W 28/16 |

OTHER PUBLICATIONS

An Architecture for Advanced Networking Technology for Integrating Communications in Space (Year: 2020).*
(Continued)

*Primary Examiner* — Linglan Edwards
*Assistant Examiner* — Phuc Pham
(74) *Attorney, Agent, or Firm* — Lee & Hayes, P.C.

(57) ABSTRACT

Systems, methods and devices for implementing cryptographic and security-in-depth techniques on-board spacecrafts or satellites are provided, to allow users to task activities or retrieve satellite data from the satellite system in an anonymous, secure, safe, and private manner, such that no other user sharing the satellite system resources can know what has been tasked or transmitted to the ground. Considerable advantages can be realized by providing spacecraft or satellite systems with a substantial capacity of applying security-in-depth and cryptographic techniques and protocols to data and requests, based on autonomous tasking, allowing a secure, safe and private use of spacecraft or satellite resources.

20 Claims, 7 Drawing Sheets

(58) Field of Classification Search

USPC .......................................................... 713/170

See application file for complete search history.

(56) References Cited

OTHER PUBLICATIONS

Invitation to Pay Fees dtd Sep. 9, 2021 for PCT App No. PCT/US21/38535.

The International Search Report and Written Opinion for PCT Application No. PCT/US21/38535, dtd Nov. 17, 2021.

Birrane, et al., "An Architecture for Advanced Networking Technology for Integrating Communications in Space," Published in: 2020 IEEE Aerospace Conference, Aug. 21, 2020, 7 pages.

The European Search Report, mailed on Jul. 16, 2024, for European Application No. 21829537.6, a counterpart foreign application of the U.S. Appl. No. 18/011,725, 9 pages.

Yuan, et al., "A survey on secure routing protocols for satellite network," Journal of Network and Computer Applications, ScienceDirect, Jul. 31, 2019, 17 pages.

* cited by examiner

SOFTWARE UPDATES

USERS ENDORSEMENT
1002

🔒 SOFTWARE UPDATE
$DS_C$  $DS_{OW}$  $DS_{Sat}$

SATELLITE RECEPTION &
VERIFICATION
1004

(EMBEDDED)
SOFTWARE/SOFTWARE
UPDATES AUDIT
1008

SOFTWARE UPDATE
INSTALLATION
1006

ANONYMOUS, AUTHENTICATED AND PRIVATE SATELLITE TASKING SYSTEM

CROSS REFERENCE TO RELATED APPLICATION

This application is a US national stage entry of International Patent Application No. PCT/US2021/038535, filed on Jun. 22, 2021, which claims priority to U.S. Provisional Application No. 63/044,892, filed on Jun. 26, 2020, entitled "ANONYMOUS, AUTHENTICATED AND PRIVATE SATELLITE TASKING SYSTEM", the entire contents of which are incorporated herein in their entirety by reference.

BACKGROUND

Spacecrafts and artificial satellites are commonly designed for several applications, for example, earth-observation satellites collect images of the Earth for environmental monitoring, meteorology, cartography, agriculture, among other useful purposes, communications satellites provide communication channels to receive and retransmit signals, scientific experimentation satellites are designed for experimental purposes, atmospheric spacecrafts collect data about the atmosphere of a planet or natural satellite, observatory spacecrafts, and so forth. In some situations, a customer or user may want to obtain earth or space data or use services without disclosing what data or service is of interest. However, typical commercial systems work upon receiving detailed requests from the users including specific information the user prefers to keep private. Consequently, even though a customer may need or want to obtain specific data, the customer is usually reluctant to disclose confidential information and may relinquish the service needed. Additionally, careful management of spacecraft and satellites' resources is required if multiple users are willing to use the spacecrafts or satellites simultaneously, in a confidential and secure manner.

SUMMARY

The information and services provided by earth-orbiting satellites and spacecrafts in general is of valuable importance for a variety of users ranging from individuals to whole countries. However, due to the costs involved in developing spacecrafts and satellites, implementing spacecraft/satellite networks to provide convenient services and coverage, developing a proper net of ground stations for communications, and the lack of tools and specialized knowledge needed to process the raw data to generate relevant information, many users cannot access this type of information in a private and confidential manner. For example, if a user wants to receive imagery data collected by an earth observation satellite from a specific area of earth at a predetermined period of time of the year, e.g. images of a determined city during summer, the user must specify the area and period of time of interest to the owner of the satellite passing over the city at the specified time. Yet, in some circumstances, the users in need of this information may want to obtain it without disclosing the geographical area or period of time, for considering it confidential. This confidentiality requirement is sometimes strong enough to justify the large investment required to launch and operate an exclusively owned satellite. Likewise, if a user wants to operate the communications payload of a geostationary or other satellite to establish a communication channel between two endpoints at specific moments in time, frequencies, modulations, bandwidths, and so forth, in a secure and confidential manner, without disclosing his intentions or the content of the transmitted data, both the configuration of the communications channels and the data packets should be protected since it may be otherwise possible for a third party to eavesdrop the communications and learn the user's confidential information, in some cases, without requiring more equipment than what's available off-the-shelf. In yet another application, a space-based manufacturing facility, for performing organic or inorganic manufacturing processes including chemical, physical, biological or biochemical processes, may offer zero gravity manufacturing services for users who may desire to use and keep secret their usage of the manufacturing equipment, including manufacturing plans, materials, parts to integrate, time of use, and so forth. At the same time, it may be more cost efficient for the owners of the space-based manufacturing facility to offer the service to many customers while offering proper privacy conditions to each of them. Consequently, many users cannot obtain the desired services or information because they do not have the resources to set up a spacecraft or satellite system for their exclusive use or do not want to request the services of a spacecraft or satellite system in order to avoid revealing confidential information. Considerable advantages can be realized by providing spacecraft or satellite systems with a substantial capacity of applying security-in-depth and cryptographic techniques and protocols to data and requests, based on autonomous tasking, allowing a secure, safe and private use of spacecraft or satellite resources.

In a non-limiting example, the execution of cryptographic techniques on-board the satellites including encryption/decryption of satellite data and requests, and the generation, use and verification of authentication data, optionally together with additional security measures, implement an on-board security-in-depth strategy that can maximize the security of the system and provide a private connection, as illustrated in the following scenario. In a constellation of satellites, each satellite may be configured to have public and private keys. The satellite may be further configured to autonomously generate public and private keys, for example, after launch and during the commissioning stage; or may be configured to receive cryptographic keys on the ground before launch. The satellite may share the public key with the owner of the constellation of satellites, satellite operators, other orbiting satellites and/or ground-based users, and store the private key in an on-board Trusted Platform Module (TPM), dedicated controller, or a secure storage or memory, only accessible by the satellite. By using cryptographic keys any user can communicate information to the satellite in a secure encrypted channel when privacy is a concern, and by using dedicated software or hardware for managing cryptographic keys another layer of security is added. The use of at least two layers of security on-board the satellite provides a security-in-depth strategy for enhancing the security of the system. Security-in-depth (SiD), also known as defense-in-depth (DiD), refers to multilayered security measures to ensure the protection of a place, a system, data or any valuable asset. The term SiD also refers to an information security approach in which a series of security mechanisms and controls are thoughtfully layered throughout a computer network or a system to protect the confidentiality, integrity, and availability of the network or system, and the data within. SiD also provides better protection in multiuser environments as the ones described in the Detailed Description. For example, any customer may define a tasking plan, encrypt it with the public key of the satellite, and transmit it through a net of ground stations to reach the satellite. The satellite receiving the encrypted tasking plan may be further configured to verify the identity of the customer and the integrity of the tasking plan, providing a verification step which adds another layer of security to the system. The satellite may also receive permissions granted to the customer, which may be encrypted with the public key of the satellite, so that the satellite may determine the satellite resources that may be assigned to the customer. Only the satellite may decrypt the tasking plan, user permissions or any other received information using its private key, verify the customer's permissions, the tasking plan integrity and the customer's identity, and perform the planned tasks. Apart from identification, authentication, and encryption operations, a dedicated software or hardware on board the satellite may further implement additional layers of security such as device integrity verification, attestation protocol implementation, obfuscation process implementation, among others. By operating in this manner, several protection layers are implemented and no one can read the tasking plan during the whole process, only the customer and the satellite involved in the process, providing a secure and private method for tasking a satellite system, without requiring the user to have their own ground station infrastructure.

In another non-limiting example, the satellite system has the ability to provide satellite data to several customers in a secure and confidential manner without revealing to anyone, not even the owner or operators of the satellite system, details regarding the satellite data requested. For example, a customer may want to obtain imagery data from particular cities within a country, without disclosing which cities. So, the customer selects, using a software executed, for example, on a desktop computer, a country having the cities from which she/he wants to retrieve imagery data. The customer may purchase the service from the owner of a commercial satellite constellation, by requesting imagery data from the selected country collected by a predetermined number (e.g. five) of satellites of the constellation. In order to complete the purchase, the customer generates a public key which is shared with the owner. The owner or operator assigns an operating window to the customer including the country determined by the customer, or even a larger area, and five satellites as requested by the customer (in this example). In order to assign the satellites to the customer, the owner or operator, may send messages including 1) the public key of each of the five satellites to the customer, 2) the customer's public key to each of the five satellites, and/or 3) a description of permissions assigned to the customer to each of the five satellites (in some instances the customer's permissions may be sent to the customer and the customer may send the permissions to the satellites together with the request). The owner or operator may encrypt the messages that need to be sent to the satellites using the public keys of the satellites, so only the satellite may decrypt them. The encrypted message may include the customer's public key, a key encrypted based on the satellite's public key, the permissions assigned to the customer, or any other information that the owner or operator may send to the satellites. Additionally, the owner or operator may encrypt the messages that need to be sent to the customer using the public key of the customer, so only the customer may decrypt it. The message may include the five satellite public keys that the customer may use to encrypt messages to be sent to the satellites. The owner or operator may further attach an authentication code (e.g. a digital signature) to the messages to be sent to the customer, and the same or a different authentication code to the messages to be sent to each of the assigned satellites, so the customer and the assigned satellites may verify the identity of the owner or operator sending the message, as well as the integrity of the message. Likewise, the customer may also attach an authentication code so that the satellite may verify the authenticity and integrity of any message sent by the customer. After receiving the message having the public keys of the five satellites, decrypting the message, and verifying the origin and integrity of the message, the customer may use the satellite's public keys to send requests to each of the five assigned satellites. The customer prepares a request containing a tasking plan and specifying the particular cities or coordinates from which she/he wants to retrieve imagery data. The customer encrypts each request with each of the satellite's public keys and signs or tags the encrypted requests with a customer's authentication code. The customer subsequently sends the encrypted and signed requests to each of the assigned satellites, which may only be decrypted by the five satellites tasked to capture imagery data. Each one of the five satellites receiving the request and the authentication code confirms the origin, integrity and permissions of the customer, and subsequently executes the customer's request. Thus, while the operating window is active, i.e. while the five assigned satellites are flying over the selected country, the five appointed satellites capture images of the particular cities or coordinates specified on the customer's request, and download the imagery data to the customer. The satellites capturing the imaging data may also encrypt the collected data using the customer's public key and, in some instances, may add an authentication code to the captured imagery data. The encryption of the messages provides a safe and private flow of data protecting from the disclosure of the transmitted data, and the authentication code added by the satellites allows the customer to verify that the required imagery data is effectively coming from the assigned satellites and not by a man-in-the-middle generating fake information, and that the imagery data has not been altered. The secured and encrypted imagery data is transmitted through ground stations to the customer, who can receive the requested imagery data through his desktop computer or cloud infrastructure. Given that the satellites are equipped with on-board security-related functions, no one but the satellites and the customer can know the particular cities or target locations selected and the data obtained by the satellite system, providing a secure and confidential exchange between the satellites and the customer. Thus, the customer can receive the required satellite data in a private manner, maximizing the security and confidentiality of the service.

In another non-limiting example, the customers may have full operative control of one or more satellites for the extent of the operating window, during which a customer of the satellite system is given the exclusive, anonymous, secure and safe use of the satellite system. For example, in this scenario a Customer may want to track a ship in the Atlantic Ocean in front of the Brazilian coast, without disclosing it. So, the Customer selects, using a software executed in a smartphone, a region of the Atlantic Ocean from Mexico to Argentina. Consequently, the Customer purchases an operating window by determining a geographical region relatively larger than the region she/he is interested in, where she/he wants to have full operative control of at least one satellite, and provides her/his public key along with her/his digital signature to the Operator of the constellation of satellites. The Operator determines an operating window for the Customer by defining the geographical area selected by the Customer and a set of permissions, enabling the Customer to use available payloads, resources and modules of the satellite, so that the Customer does not disclose the specific tasks she/he wants the satellite to perform. The Operator may link the customer's public key to the permissions, sign the permissions with a digital signature, and send the signed permissions to the Customer. After being assigned an operating window, the Customer may prepare and encrypt requests, and send the requests to the satellite, along with the permissions signed by the Operator. The Customer may also sign the requests so that the satellite may verify the customer's identity and the integrity of the requests. The satellite receiving the encrypted and signed message including the requests and permissions, decrypts the message and evaluates the identity of the Customer and Operator and the integrity of the requests and the permissions, and, after verifying the permissions associated to the customer's identity, executes the customer's requests. In this example, the satellite is capable of identifying objects or features on the surface of the earth, so the Customer may task the satellite based on content. The request sent by the Customer tasks the satellite to capture imagery data of the Atlantic ocean in front of the Brazilian coast while the operating window is active, so every time the satellite detects a ship it should identify it by analyzing the captured images, and if it is the ship of interest, the satellite should follow it with a high-resolution camera, capture images or video of the ship of interest, encrypt the results, optionally adding an authentication code, and download them to the Customer, usually though a net of ground stations. Thus, the satellite system provides a fully private exchange of satellite data between the satellite system and the customer, given that the customer operates the satellite without disclosing the tasks performed or the specific geographical area where the task is executed, which in this example corresponds to the area from which he wants to retrieve imagery data related to the ship.

Further features and advantages, as well as the structure and operation of various embodiments are described in detail below, with reference to the accompanying drawings. It is noted that the invention is not limited to the specific embodiments described herein. Such embodiments are presented herein for illustrative purposes only. Additional embodiments will be apparent to persons skilled in the relevant art(s), based on the teachings contained herein.

BRIEF DESCRIPTION OF THE DRAWINGS

The Detailed Description is set forthwith reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
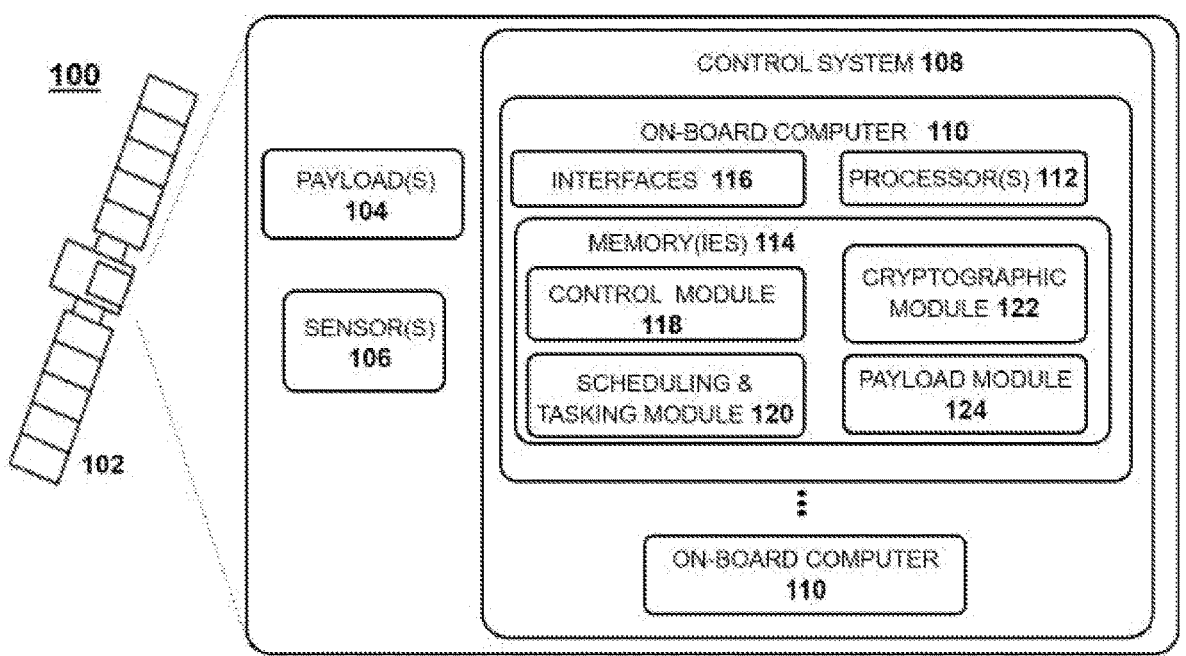
FIG. 1 is a block diagram of an example system comprising a satellite, according to embodiments of the present disclosure.

Embodiments include systems, methods and devices for implementing cryptographic and security-in-depth techniques on-board spacecrafts and satellites to allow users to task activities or retrieve data from the earth or space collected or generated by the spacecraft or satellite in an anonymous, secure, safe, and private manner, such that no other user sharing the spacecraft or satellite resources can know what satellite activity has been tasked or what data has been transmitted to the ground. For sake of simplicity, only satellites or satellite systems will be mentioned in the rest of the description, however it should be understood that the same features and processes as described throughout the Detailed Description may be performed and implemented by spacecrafts (manned or unmanned), or aircraft (manned or unmanned), without departing from the scope of embodiments.

The systems, methods and devices also allow handling satellite resources between multiple users with the capability of solving competing target conflicts and securing the user and data privacy. Generally, only one user at a time may exclusively use the satellite resources but, in some instances, simultaneous operations within the same or different operating windows may be also performed. For example, a Customer may have been assigned an imaging payload system of the Satellite and may task the Satellite to capture images of one geographical region every day at the same time interval, so the imaging payload system of the Satellite is exclusively used by the Customer. However, the Satellite may perform other tasks over the same geographical region and time interval as the Customer requiring images, for example the Satellite may also acquire data to detect methane, may process data using a computational payload, or may provide communication services to other customers using the communications payloads without interfering with the tasks given by the Customer and the exclusivity of use of the imaging payload system assigned to the Customer, while maintaining the privacy between the users. Generally, payload systems that do not interfere with each other may be used simultaneously to collect data or provide services, such as communications payloads that may be used by multiple users simultaneously. In particular, these payload systems include payloads with compatible aiming requirements. In some instances, the satellite may implement resource allocation resolution methods comprising determining the non-competing tasks that may be performed by the satellite for the extent of a given operating window.

A User may be a space-based user, such as a Satellite, Payload or a Subsystem inside a satellite of the satellite system, or may be a ground-based user, such as a Customer, an Operator, an autonomous system or an Owner of the satellite system. In some instances, a custom-built payload of the satellite may be a User of the satellite system. For example, a camera or radio payload designed and built by a customer may be integrated into a satellite of the satellite system. And when the custom-built payload requires resources from the satellite, the payload may act as a user of the orbiting satellite, using or accessing the satellite resources (storage, data download, etc.) after being identified by the satellite (e.g. by the satellite bus) using cryptographic means.

In some instances, the Owner may configure the satellite system to provide the Users with complete access to the orbiting satellite(s) (full privileges), or different levels of access to the orbiting satellite(s) (partial privileges). For example, the Owner may have all or higher privileges to use satellite resources than Operators, and may give selected privileges (higher, equal or lower than operators) to the Customers for the extent of their assigned operating window.

As used herein, an operating window refers to a parameter that determines the exclusivity, i.e. the right to have or do something with the satellite system, for instance, time windows, particular geographical areas, quotas or usage limitations, or any other criteria for delimiting the right of using, tasking or performing any action with one or more satellites of the satellite system. For example, the operating window may determine the extent or range during which a Customer is assigned satellite resources, such as a period of time, a number of satellites, total energy available to be used, storage quotas, and so on, for which the Customer has exclusive access and use of the satellite resources. The operating window may be determined by defining one or more of at least a period of time, a geographical area, an extent in space, a number of satellites, a resource allotment, or any combination of these. The operating window may be determined by any User of the satellite system such as the owner, customers, operators or satellites, and is subsequently assigned to a particular User, along with privileges and permissions, as will be described elsewhere within this Detailed Description. For example, a local authority of a city may represent the city as a Customer and may determine an operating window by defining a country and a time window from 10 am to 5 pm GMT every Tuesday for 6 months. This operating window has a broader scope than the actual region and time frame wanted by the Customer, allowing the Customer to retrieve data from the satellite without disclosing to the Owner the exact location and times of the day from which the Customer wants to obtain and/or receive information. The Customer asks for that operating window to the Owner, and the Owner assigns the requested operating window to the Customer. The operating window may be assigned by generating a description of permissions and privileges as will be described elsewhere within this Detailed Description. By operating in this manner, the satellite system provides a private system, since the Customer does not share with the Owner the frequency at which it wants to receive satellite data, or any particular city or time frame from which it wants to obtain satellite data, keeping this information confidential. As will be described elsewhere within this Detailed Description, this information and other relevant data is kept confidential during the entire process, i.e. during and after the Customer uses the satellite resources. Additionally or alternatively, the operating window may be autonomously determined by the satellite system. For example, an orbiting satellite may determine one or more operating windows and assign them to other satellites or to some subsystems of the same satellite, in order to administer its resources with other satellites or within its own payloads.

Embodiments include a private satellite tasking system comprising one or more satellites, including satellite constellations, satellite clusters and/or satellite fleets, comprising for example, earth-observation satellites, communications satellites, in-orbit manufacturing satellites, scientific experimentation satellites, energy generation satellites, low-cost satellite, expensive satellites, geostationary satellites, polar or other inclinations orbit satellites, space tugs, or any combination of these. The satellites are configured to implement cryptographic and security-in-depth techniques while in orbit, including encryption/decryption of satellite data and requests, and generation, use and verification of authentication data, virtualization, isolation, compartmentalization, access control and resource allocation. Satellite data may comprise raw, processed and/or analyzed data such as images, videos, telemetry data, tasks, results of analysis performed to the data captured by the satellite's own sensors or by sensors of other satellites (or other manned or unmanned aerial vehicle) which may be transmitted to the satellite to be analyzed, processed or collected, or any other type of information generated by the satellite. The satellites are equipped with one or more on-board computers usually comprising memories and processors, which may be programmed from the ground to perform various tasks and/or may be programmed in orbit. The satellites may also be equipped with sensors and payloads, designed and built according to the type and functions of the satellites. In some implementations, the payload may be a payload system comprising one or more sensors, for example an imaging payload comprising an imaging sensor for remote sensing applications, a radar or synthetic aperture radar sensor, a gas detection payload comprising gas detectors for gas emission monitoring, a communication payload comprising radio transponders for communication satellites, a custom-built payload comprising other sensors designed for particular tasks required by a customer, a pure computational payload, such as a machine learning, image processing, data analysis or data processing payload, an energy generation payload, a 3d printing or computer numerical control (CNC) payload, and so forth. The imaging sensor may include one or more cameras such as a wide-angle camera designed to capture relatively wide field-of-view imaging data, a narrow field-of-view camera having a relatively narrow field of view and which may generally also provide more detailed resolution images; a general purpose camera for broad field-of-view imagery, a TIR camera for thermal imaging data and infrared imaging data; a multispectral camera or a hyperspectral camera, cameras aiming towards the exterior of the satellite to image, for example, images of the Earth or external parts of the satellite, or cameras pointing towards the interior of the spacecraft, to capture internal processes and parts, such as the manufacturing results, among others.

Embodiments include various operations that may be implemented by the private satellite tasking system. For example, the private satellite tasking system may perform unauthenticated true-anonymous operations as illustrated in the following example. An unknown customer may send an encrypted anonymous request to the private tasking system and/or some or all the satellites belonging to a satellite constellation and may accompany the anonymous request by a monetary token. Examples of monetary tokens include, but are not limited to, Bitcoins, Ethereum, verifiable money deposits (e-checks), pre-approved private tokens issued by the Owner, Operator or any other User with delegation capabilities, or any other type of tangible or intangible payment form. Even though the anonymous request may be encrypted for some or all the satellites, the anonymous request may be addressed only by the proper satellites, hiding the true destination i.e. only the satellites may know the real destination. Alternatively, the anonymous request may be encrypted for the addressed satellites, but without any recipient identification, for example when using a null key ID. The proper satellite accepts the anonymous request if it can decrypt a valid request. In addition, the satellite may determine whether the monetary token accompanying the anonymous request is enough to pay for the execution of the anonymous request. Generally, the anonymous request may include an encryption key (symmetric or asymmetric) so that the satellite may encrypt all data and metadata resulting from executing the anonymous request, in order to send to the anonymous customer the data and metadata encrypted with the encryption key included in the anonymous request. One of the advantages of operating in this manner is that no other authentication or authorization is required. Furthermore, it is possible to enhance the security of the system by executing the anonymous request in an on-board computer exclusively assigned to requests from anonymous customers, adding another security layer to the system.

In some instances, the unauthenticated true-anonymous operation described above may be delayed because the satellite may need a certain amount of time to verify the validity of the monetary token before executing the anonymous request. In order to reduce or minimize any delay related to the validity verification of the monetary token, the anonymous request may be first submitted to a trusted intermediary, such as a bank, entity, autonomous service or smart escrow contract, among others, together with the monetary token. The trusted intermediary may verify the validity of the monetary token. In some instances, the trusted intermediary may further hold the monetary token in custody and issue a proof that the monetary token is available and the conditions to obtain it (e.g. time frame, what the satellite can claim if necessary, and so forth). The trusted intermediary may also issue a proof that the monetary token is withheld. The customer may attach the proofs to the anonymous request to be sent to the satellite. Additionally or alternatively, some or all of the satellites belonging to the satellite constellation may have a monetary token wallet. The customer wanting to use the satellite resources may deposit some monetary tokens in the wallet of the satellite. After receiving the monetary token, and if necessary verifying its validity, the satellite may record the transaction. The satellite may have an updated history of secured token transactions such as an updated blockchain, or a resumed version of it created and signed by an approved Operator or Owner. Additionally, the satellite may send a proof of deposit or transaction identification to the customer so that the customer after receiving it, may attach it to the anonymous request and send both to the satellite. Once the satellite receives the anonymous request including the transaction proof or identification, it may verify the validity of the monetary token matching the proof or identification with the ones recorded in the history of secured token transactions transfer before authorizing the request. After verifying the validity of the transaction, the satellite may execute the requests, encrypt the data and/or metadata as requested by the customer, and send the encrypted content to the customer.

In some instances, in order to receive the encrypted content, the customer may need to open a direct connection to the ground-based operations API, giving the system the theoretical chance of linking an IP address to the request. With the intention of reducing or minimizing the possibility of tracing the operations, a trusted intermediary, such as an Ethereum smart contract, may route an approved request to the satellite attaching credentials to it. The satellite may verify the validity of the request provided by the trusted intermediary by checking the supplied credentials, and after verifying them, the satellite may execute the request. The credentials may include a cryptographic proof, a transaction identifier in a blockchain, a chain of trust signed with private keys, or any other means acting as proof or identifier. All data and metadata resulting from the execution of the request may be encrypted with the encryption keys enclosed to the request to form the answer to the request. The satellite may deliver the answer to the trusted intermediary which releases the payment to the satellite, the payment including monetary tokens, assigned wallet, bank account, and so forth. The existence of the answer is delivered to the customer who is able to retrieve it. In some instances, all the answers provided by some or all the satellites of the constellation may be streamed to all customers; however only the customers with proper keys may decrypt them, so that nobody knows who decrypts which answer. Alternatively or additionally, the answers may be made available through a third party storage system. The third party storage system cannot know what request corresponds to what answer since it does not know what data was requested. In addition, the third party storage system cannot link the customers sending the requests to customers downloading the answer. In some cases, the origin of the monetary token may be traceable, however only the satellite may know for what purpose the token was used for, maintaining the confidentiality of the operation. By operating in this manner, the constellation of satellites cannot know anything about the identity of the customer sending the requests and the originating system cannot know anything about the nature of the request. The request itself is only decrypted in the right satellite and the answer is decrypted by the right customer.

The connecting lines shown in the figures contained in the Detailed Description are intended to represent example functional relationships and/or physical couplings between the various elements. It should be noted that many alternative or additional functional relationships or physical connections may be present in an embodiment of the present disclosure.

FIG. 1 is a block diagram of an example system 100, according to embodiments of the present disclosure, comprising a satellite 102, which in some instances forms part of a constellation of satellites. The satellite 102 may include one or more payloads 104, and one or more sensors 106. The sensor(s) 106 includes any sensor on-board the satellite that generates data, and may include image sensors, instruments for Earth observation, temperature sensors (e.g., thermal imaging sensors, or infrared sensors), sun sensors, earth sensors, power meters, attitude sensors, and the like. In some instances, some (or all) of the sensor(s) 106 may form part of a payload 104, for example one or more imaging sensors may form part of an imaging payload system, whereas in other instances the sensor(s) 106 are used to generate data for operating modules such as the attitude and orbital control subsystem (AOCS) module, power module, and so forth, and may form part of operational systems. The satellite 102 may include a control system 108 for handling the functions of the satellite 102. The control system 108 may include on-board computers 110 for handling tasks of the users, the tasks of the satellite, functions of payload(s) 104, sensor(s) 106, and other subsystems on board the satellite. The one or more on-board computers 110 may comprise physical components, virtual components, or a combination of physical and virtual components. In some instances, some components of the one or more on-board computers and/or payload systems may be on-board the satellite and some components may be ground-based or on-board a separate satellite or spacecraft, with such ground-based or separate spacecraft in communication with the one or more on-board computers. The one or more on-board computers 110 may comprise one or more processors 112, one or more memories 114 and interfaces 116. The one or more processors 112 may include central processing units (CPU), graphics processing units (GPU) or both CPU and GPU, or any other sort of processing unit, such as, for example, digital signal processors (DSPs), field programmable gate arrays (FPGAs), application-specific integrated circuits (ASICs), or others, such as, artificial intelligence and machine learning accelerators. Interfaces 116 include physical arrangements for connecting the components of satellite, for example input/output interfaces, bus hardware for connecting components of the on-board computer(s) 110 to perform computer bus functions, such as a data bus function to carry information, an address bus function to determine where the data should be sent, and a control bus function to determine the overall computer's operation, and so forth. One or more memories 114 may store program instructions and program modules that are loadable and executable on one or more processor(s) 112, as well as data generated during execution of, and/or usable in conjunction with, these programs, such as image data, images, analysis results, and so forth. Depending on the configuration and type of on-board computers used, one or more memories 114 may include volatile memory (such as random access memory (RAM)) and/or non-volatile memory (such as read-only memory (ROM), flash memory, etc.). One or more memories 114 may also include additional removable storage and/or non-removable storage including, but not limited to, flash memory, magnetic storage and/or optical storage, and/or tape storage that may provide non-volatile storage of computer-readable instructions, data structures, program modules, and other data. One or more memories 114 is an example of non-transitory computer-readable media and may store various instructions, routines, operations, and modules that, when executed, cause the processors to perform various activities. Non-transitory computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory (such as NAND flash memory such as may be included in one or more nonvolatile memory cards, and including flash with both single-level and multi-level cell technologies) or other memory technology, compact disk read-only memory (CD-ROM), digital versatile disks (DVD) or other optical storage, magnetic cassettes, magnetic tape, magnetic disk storage or other magnetic storage devices, solid state drives (SSDs) or any other tangible, physical medium which can be used to store information and which can be accessed by a computing device.

In some implementations, the one or more on-board computers 110 of the system 100 comprises one or more Owner computers, one or more Operator computers, and one or more Customer computers so that at least one on-board computer is assigned to a user and/or user profile. The on-board computer assigned to a user and/or user profile may be at least one of a physical machine, a virtual machine, or an application container, and a combination of them may coexist when the satellite has more than one user. For example, for a given number of users the computers on-board the satellite may comprise a few physical machines, a few full virtual machines, a few lightweight virtual machines, a few operating system user profiles and/or a few capabilities configuration settings. As used herein, a virtual machine refers to an emulated equivalent of a computer system that runs on top of another system, and application containers refers to applications running on a system (rather than the whole operating system provided by a virtual machine) isolated from the host system that they run on (operating-system-level virtualization). For example, the satellite may comprise a physical machine for the satellite and other physical computers, one for each of the users (e.g. customers, operators, owners, payloads, satellite subsystems, other satellites of the satellite system). Additionally or alternatively, the satellite may comprise a physical machine to provide a hardware platform for performing satellite's tasks, and different virtual machines and/or application containers for each of the users, so that software applications and/or operating systems may run independently for each of the users of the satellite, keeping the programs running inside of a virtual machine or container of one user safe and isolated from the processes taking place in the virtual machine or container of another user on the same host. By using these architectures, the system 100 allows multiple users to coexist on the same satellite but isolated (either physically or virtually) from each other, in order to provide a private system that each user may control separately.

In some implementations, the virtual machines or application containers comprising some or all of the on-board computers 110 may include full system virtual machines, supporting the execution of an operating system with its applications, such as supported by QEmu, VirtualBox, Xen, KVM, or any other virtualization product that would be reasonably suitable for implementing virtualization or full virtualization as described herein, with or without any hardware assistance. In some instances, some or all of the on-board computers 110 may include a Lightweight Virtual Machine (LVM) wherein the operating system kernel is shared across multiple users, but significant isolation between users is ensured by the environment, such as those supported by Linux LXC/LXD, docker, or any other virtualization product that would be reasonably suitable for implementing lightweight virtualization as described herein. These lightweight VMs use less resources than System VMs and some base software may be shared (e.g. part of the Operating System (OS)). In some instances, the isolation between users and the separation of privileges and permissions may be implemented by using different OS users with different capabilities for different users, allowing for some sort of authorization control.

One or more memories 114 may store one or more modules for controlling the satellite 102, the payloads 104, and the sensors 106 and for other satellite-based tasks. In some embodiments, the control system 108 may include modules such as a control module 118, a scheduling & tasking module 120, a cryptographic module 122, and a payload module 124. It should be appreciated that not all of the modules need be present in every embodiment, that several modules may be present for one or many of the purposes described, and that additional modules may be present for other purposes, such as a communications module, a propulsion module, an AOCS module, a power module, or any other module required for the proper functioning of the satellite. The modules stored within the one or more memories 114, in many instances, provide for control of other systems and hardware on board the satellite.

The described system 100 provides for at least the following beneficial features: 1) private satellite usage so that each user may use the satellite resources and obtain satellite data without revealing confidential information; 2) secure satellite usage by providing means for authenticating the identity of the satellite and users and authorizing what each user may or may not do; 3) safe operation management of satellite resources, data and metadata by increasing the security measures throughout the system; and 4) safe exchange of information by providing means to verify the integrity of the messages exchanged between the satellites and users. As used herein, the term metadata is a broad term and refers to any spacecraft (e.g. satellite) telemetry, resource utilization, execution and application logs, or any other information about the spacecraft properties and usage.

The control module 118 may perform some or all of the control functions associated with the satellite 102 and is configured to control some or all subsystems of the satellite 102 through one or more input/output interfaces. For example, an imaging payload comprising an imaging sensor may be controlled to capture one or more images, perform image processing functions and analysis of the captured images; an antenna may be controlled to provide for a communication channel with one or more ground stations on the surface of the Earth or with other satellites within the satellite system (e.g. a satellite constellation); a propulsion system in conjunction with an AOCS system may be controlled for positioning or repositioning the satellite; a power system may be controlled for managing the power storage; and so forth with some or all of the subsystems of the satellite.

The scheduling & tasking module 120 is configured to assign satellite resources (hardware and software resources) between one or more users, for the extent of their corresponding operating windows. The satellite resources comprise hardware and software resources including at least one of payload systems, storage, sensors, upload or download bandwidth capacity, application containers, virtual or physical on-board computers, modules, supplies used by the space-based manufacturing facility, operating windows, satellite tasks, requests (tasking or data requests), cryptographic operations, data or information that is stored, collected or processed (without breaching the privacy of users), and so forth. The modules comprising the satellite resources may include any satellite module for example processing or analysis modules for signals (e. g. adjusting frequencies, bandwidths, apply modulations), images, substances (e.g. gas quantification), modules for pointing (e.g. AOCS module, propulsion module), power modules for power usage and generation, and so forth. For example, a Customer or Operator may send a request to a Satellite with instructions to perform tasks. The tasks may include instructions to perform payload operations, software upgrades, data analysis, security checks, housekeeping activities, or any other function that would be reasonably suitable for executing on-board the satellite. In some instances, the user may send a request including instructions to direct the control module to control the satellite, to use one or more payloads such as an imaging payload to capture images, a gas detection payload to detect methane, and so forth. Additionally or alternatively, the request may include instructions to perform no tasks or actions (i.e. "do nothing") or to generate random or irrelevant payload data during a predetermined period of time or frequencies, on a particular geographical location, and/or at trigger conditions or events (for example, if a certain parameter exceeds a threshold). The user may also send a request including instructions to download metadata having information of the satellite's activity gathered or generated during the assigned operating window and, in some instances, may use the metadata to verify the satellite's activity for example, by checking the number of captures performed by a camera such as a secure capture counter, or may verify whether or not the satellite executed the request of performing no task or action, for example, by checking the power consumption of the whole system or the power consumption of particular payloads, and so forth. In some implementations, the request sent by the user may include instructions to lock the payloads during an operating window, so that nobody, except the user controlling the satellite, may use the satellite during it. The request may also include instructions to save, download and/or discard data or payload data. In some implementations, the user is given the ability to upload programs to the satellite to be executed, and some of these may be executed on-demand.

In some instances, apart from sending a request, the users may additionally or alternatively upload or send information or data to the satellite, so that the satellite may use the information or data provided by the user to perform the tasks required by the user. For example, a Customer may send instructions or blueprints for 3D printing objects, spacecraft parts or scaffolds for tissue engineering, may send instructions for manufacturing portions of or whole organs or tissues, or may send plans or directions for performing processes using the space-based manufacturing facility on-board the spacecraft. Also, the Customer may send information for being used by computational payloads on-board the satellite for example for performing analysis tasks such as machine learning or artificial intelligence analysis payloads. The information may include training datasets or weights for modelling the connection or any other input commonly used in artificial neural networks or machine learning algorithms.

In some instances, the satellites are equipped with a level of autonomous tasking and the satellites themselves may have the ability to autonomously make decisions. The scheduling & tasking module 120 may be further configured to create tasks and/or reprioritize satellite tasking or list of tasks, based on any number of factors or combinations of factors. For example, the satellites may decide when to perform or create a task, based on the users' assigned permissions and operating windows, and also based on information from its sensors, the data or metadata requested by the user (data types, frequencies or trigger conditions), the availability of resources (storage, power, payloads, processors), the outcomes of conflict-resolution decisions, processing or analysis specifications (e.g. radiometric correction, ortho-rectification, stitching, projection models, sensor models, atmospheric correction, geo-location, and so forth), monitoring frequency requirements (minimum frequency, maximum frequency, target frequency distribution), quality of acquired data, obstructions to areas, points or objects of interest, and so forth. The scheduling & tasking module 120 may perform resolution and resource allocation tasks, including but not limited to, pre-cooked assigned windows, prioritization of users, prioritization of tasks of users, implementation of bidding operations for resource system allocation, implementation of bidding systems using cryptographic autonomous agents, and so forth.

In some instances, the request uploaded or transmitted to the satellite by the user may comprise executable code. The executable code may be in the form of binary code comprised of native instructions, or source code to be compiled into native instructions on board the satellite, or it may be in any suitable scripting language, such as, for example, Python, Java, Smalltalk, Go, or any other suitable programming language capable of providing instructions to the satellite. In some instances, the request may include data acquisition instructions, data processing instructions, data analysis instructions, and/or configuration settings. Once the executable code, instructions or configuration settings are received by the satellite, they may be saved for later execution, such as when the user's operating window is active or when a trigger condition is detected. In some implementations, the request may be transmitted to the satellite, owner or operator using standardized software, such as via an internet browser which communicates with a web page associated with a user interface.

In some implementations, the scheduling & tasking module 120 is further configured to control the status of the one or more on-board computers 110. For example, on-board computers may be configured to persist their state, in some instances from invocation to invocation, and save the status to be carried from execution to execution or discard it (e.g. plan execution evolution status, intermediate results, and so on) or may be configured to be stateless, relying on an external mechanism to load all required configuration and parameters (e.g. tasks and plans, cryptographic material (keys), and so on). By operating in a stateless configuration, the computers may provide a clean state when a user starts using the satellite, and more importantly, may conclude that all information (e.g. data and metadata) will not be kept by the system after the user has finished using the satellite resources or the user's operating window has finished, except when explicitly stated by the user application. In some instances, multiple users may share on-board computers configured to be non-persistent computers, provided that no more than a single user is active at the same time or that other measurements are taken to protect their data and metadata.

In some implementations, the user may utilize the hardware and/or software satellite resources to implement obfuscation processes in order to impede other users from collecting or accessing any data or metadata derived or generated from the use of the satellite and utilize it to learn or infer what the user was doing. In some instances, the global satellite state may leak information about an active user's action to other users, consequently the active user may decide to take action to obfuscate this information by tasking the satellite to set a predetermined global satellite state configuration before handing in the satellite to other users with a global satellite state that prevents the other users from learning what the active user was doing with the satellite resources during its operating window. The global satellite state may include information on the status of the satellite's attitude, battery charge state, reaction wheel speed, used storage space, components' temperature, and so forth. Usually, implementing global state obfuscation processes to obfuscate the global state of the satellite may have cost implications for the user, as more satellite resources might be used. For example, a Customer may task the satellite either to turn on the hardware and heaters, consume power, and safely heat all the systems of the satellite, or to turn off the hardware and heaters in order to cool down all the systems of the satellite, for a given period of time, just before handing in the control of the satellite to other Operator or another customer. The implementation of these obfuscation processes may imply having the satellite for longer than strictly required, or not being able to task the satellite close to the limits of the assigned operating window. However, the Customer may precisely determine the tasks to be performed by the satellite and the extent of the operating window, to include the implementation of obfuscation processes. Examples of additional or alternative obfuscation processes include 1) performing one or more extra maneuvers before the end of the assigned operating window to hand in the satellite pointing to a predetermined direction (e.g. pointing to nadir) so that it is not possible to know the area, object or point of interest from which the Customer wants to retrieve data; 2) forcefully reducing the speed of the reaction wheels; 3) consuming battery down to their assigned quota, or more responsibly, deciding to task battery charging maneuvers during their assigned operating window leaving the satellite fully charged, or charged up to a fixed value, so that the tasks performed by the satellite may not be inferred from the consumed power, and/or 4) creating fake results to store in the satellite with real results (which once encrypted can be indistinguishable from real results) so that the amount of real results stored by the Customer is unknown. In some instances, if the satellite allows the users to know how much storage is available for each of them, then the satellite may assign storage space and quotas to each user independently, and only show the available storage left for the particular user.

As explained above, the user may implement obfuscation processes by using the standard software and/or hardware resources provided by the satellite so that no one can know the user deliberately intended to obfuscate its actions. However, in some instances, the satellite may offer specialized software and/or hardware to implement obfuscation processes. For example, the scheduling & tasking module 120 or a separate module may be configured to implement obfuscation processes by setting the global satellite state in a chosen configuration, before releasing the satellite to another user. This is useful in situations in which the knowledge of the global satellite state could leak information leading to insight on what a user was doing. In other instances, the scheduling & tasking module 120 may be configured to set the state of a particular satellite resource to a particular state configuration, before releasing the control of the satellite to another user, enabling the user to consume fewer resources to implement the obfuscation processes during its operating window. In this manner, the obfuscation processes may be implemented by setting the state of a satellite resource in a chosen configuration, instead of setting the global satellite state in a chosen configuration. This is also useful in multiuser environments where one of multiple users is assigned a predetermined number of satellite resources from the all satellite resources of the satellite and may need to release the predetermined number of satellite resources to another user of the satellite without revealing through the state of the satellite resources what the user was doing.

Additionally or alternatively, a user may send a request to the satellite determining the amount and manner in which the satellite data is downloaded (e.g. when, how, who), as an additional security measure so that no other party or device may correlate the amount and manner the data is downloaded with the data obtained from the satellite. For example, a Customer may task the satellite data to send raw data or analysis results randomly, continuously, or at predetermined conditions such as at particular times frames or when passing over particular geographical areas or ground stations. Also, the Customer may task the satellite to send fake satellite data interspersed with real satellite data in order to mislead any party or device that wants to derive information from the amount or manner the data is downloaded. In some instances, the satellite may implement traffic analysis or active traffic analysis countermeasures including, but not limited to, constant or variable interval timer controlled packet transmissions, link padding, dummy traffic padding, adaptive traffic padding or on-demand traffic padding. Generally, the identity of the user and the one or more tasks to be performed by the satellite are further encrypted to prevent any other user, the ground stations, or any other party intervening in the communication between the orbiting satellite and the users from learning who is sending requests or receiving tasks, satellite data, analysis, or even whether or not the user is communicating with the satellite, but even in the presence of proper cryptographic protocols, traffic analysis may reveal some of the metadata if traffic analysis countermeasures, as those described, are not active. The user may task the satellite to perform traffic analysis countermeasures using the standard software and/or hardware resources provided by the satellite, however, in some instances, the satellite may offer specialized software and/or hardware to implement these processes, for example using a communication module adapted to implement traffic analysis countermeasures, generally more efficiently than the users, so that the users do not need to spend part of its operating window performing these processes.

The cryptographic module 122 may perform some or all of the functions associated with cryptographic and security-in-depth techniques in accordance with embodiments of the present disclosure. The cryptographic module 122 may use any set of tools for encryption, authentication, authorization, integrity verification and cryptographic protocols in general, such as suitable implementation of the OpenPGP standard as defined in RFC4880's family and implemented by tools such as GnuPG, protocols and tools as provided by the OpenSSL suite, the OAuth authorization standard v2 as described by RFC6749 and associated documents, X.509 certificates as specified by RFC5280 and related RFCs, the PKCS family of algorithms, protocols and definitions, or any other, including custom protocols and algorithms agreed by the owner, operators and customers. The cryptographic module 122 provides security-related functions including, but not limited to, use, generation, verification, storage and authentication of cryptographic keys and satellite and user's data. For example, the satellite may comprise a Trusted Platform Module (TPM) configured to perform various operations, including the creation and management of keys such as session keys, public keys, private keys or sets (pairs) of public/private keys for symmetric or asymmetric encryption. The TPM of the satellite may generate a cryptographic key comprising a public portion, to be shared or distributed among the users of the satellite, and a private portion to be kept on the satellite. The TPM may be further configured to provide storage of keys and other secret data, keeping the keys or data separated from the memory that is controlled by the users of the satellite, namely the owner(s), operator(s) or customer(s). For example, the TPM may store the keys of the users so that the satellite may authenticate the user's identity upon receiving a request, and in some instances, may also store the permissions and privileges associated with each user.

In some instances, the cryptographic module 122 may be further configured to provide a mechanism for program instructions (e.g. software) to prove their identity, generally known as attestation or remote attestation, so that the satellite may present reliable evidence to (local or remote) users about the software it is running. Any type of attestation protocol may be used, including basic remote attestation protocols, direct anonymous attestation schemes, and so forth. For example, it may be possible for the satellite or an on-board computer inside the satellite to attest its boot chain integrity using the TPM on board the satellite, assuring the users, in the ground or as represented by their on-board machines/processors/applications that the on-board software and hardware has not changed from a well-known and accepted state. By using this feature, the satellite may show to a user taking control of the satellite that the operating system and the application software are intact and trustworthy, providing a safe operation system.

In some instances, the cryptographic module 122 is further configured to protect the cryptographic key from disclosure by encrypting (wrapping)/decrypting (unwrapping) the cryptographic keys, so that the cryptographic keys may only be decrypted by the cryptographic module 122. In some implementations, the cryptographic module 122 may be further configured to seal the cryptographic keys by further tying the encryption step to certain platform measurements, and unseal the keys when those platform measurements have the same value. For example, the cryptographic keys may be sealed and may subsequently be unseal after verifying that the boot codes, firmware, operating system kernel and components, hypervisor code, and/or customer's machine software integrity, have the same value, allowing the users to be certain that the boot chain has not been tampered. In other instances, the key may be unsealed when the user provides a particular password.

Given that there is no possibility of physically accessing the satellite after launch, it might be difficult or even unfeasible to demonstrate that the software running on the satellite is a known version (e.g. a version uploaded and verified on the ground). Consequently, in order to give the users some level of trust regarding the software running on the satellite, the users may be given the option to perform software audits in order to verify the software running on its assigned machine, its integrity, and so forth. For example, the Customer may be offered the option to build and audit its own computer's software before launch and then install it in the satellite while the satellite is on the ground. Optionally, the Customer may build and audit the software on the ground and then install it in the satellite after launch, while the satellite is in-orbit. Even though the latter option might be more expensive it is feasible. In some instances, the Customer may be offered the option to audit the on-board software of its assigned computer while the satellite is in-orbit, to compare that the software running on the orbiting satellite is the same as it was before launch.

In some circumstances, the software running on the on-board computers of the satellite may need to be updated. Software updates that need to run on users' on-board computers may also be audited by the users. For example, a Customer may want to install software updates in its assigned Customer on-board computer. The Customer may prepare the software updates on the ground and may send the software updates to the satellite, previously signing the software updates with a customer's authentication code.

After being received by the satellite, the software updates may be stored for example in an incoming storage on-board the satellite so that the Customer on-board computer may decide whether or not to install the software updates, based on authentication signatures, permissions, and other configurations. In some instances, the Customer on-board computer may decide not to install some or all the software updates received by the satellite, skipping a software update, but this may depend on the complexity of maintaining different versions of the software running on the Customer on-board computer. Alternatively or additionally, each User may have a general configuration to disable further software updates, which may not be enabled again once disabled. In some implementations, after the satellite receives the software updates and the Customer on-board computer installs it, some or the whole system (some or all on-board computers of the satellite) may require to change the installed software version every time the Customer on-board computer is started, so the whole system matches the Customer's software version. The software that may need to be updated after a Customer on-board computer is started with the new updates, include for example, programming interfaces of the Owner or Operator on-board computers such as application programming interfaces (APIs), micro services, or programming interfaces to expose hardware through these computers; embedded software running on embedded devices that the Customer on-board computer uses to directly communicate with the hardware of the satellite; and ground-side software for packaging of incoming/outgoing information. In some instances, the software updates to Operator and Owner on-board computers may be signed and approved by the Customer before being installed, or could be fixed to a version, as described above. Additionally or alternatively, software related to security purposes (security updates) may be adapted to be used with an older software version (retrofitted) and, in some instances may be optional to the Customer (even when general updates are disabled).

In some instances, the cryptographic module 122 may be further configured to encrypt, decrypt, seal or unseal data generated outside the cryptographic module 122. For example, the cryptographic module 122 may encrypt and/seal data acquired by the payload(s) 104 and/or results generated by the satellite 102, by using the sealed key or any other stored key. All satellite data, metadata and requests exchanged with the users may be treated as confidential data and may be masked or encrypted so that only the authorized user (or any authorized sub-user) can have access to it. For example, two on-board computers 110, one being a Customer computer and the other an Operator computer, may ask the cryptographic module 122 to encrypt the data resulting from executing a task, along with the associated metadata, using the public key of the Operator or Customer, in such a way that only the recipient can unencrypt it. In some instances, the encrypted data/results may be locked (sealed) until specific hardware and software conditions are met.

In order to provide a secure system, the cryptographic module 122 may be further configured to authenticate the identity of the users (e.g. owners, customers, operators) in order to control their access to satellite data and satellite resources, and the integrity of the request sent by the users. The cryptographic module 122 may apply authentication protocols to check a key, ticket, token, digital signature or any authentication code attached to the communications sent by the users. In some implementations, the cryptographic module 122 may be further configured to link and administer the permissions and privileges associated with each user. For example, a Customer may generate a request to send to the satellite 102 and may sign the request using suitable algorithms to generate a digital signature based on the customer's private key. The satellite 102 may have registered the public keys of the customers having been assigned operating windows, along with the permissions associated with each customer's keys, for instance in a TPM. So, when the satellite 102 receives the signed request from the Customer, the cryptographic module 122 (e.g. the TPM) may apply signature verifying algorithms to check the origin and integrity of the request i.e. whether the request was generated by an authorized Customer and whether the request has not been altered or modified. In some instances, the signature verifying algorithms may determine the origin and integrity of the request based on the customer's registered public key, the request and the digital signature.

An operating window may be assigned by generating a description of permissions and privileges (P^P) and adding an authentication code to the P^P. Once the satellite receives the P^P with the authentication code, the cryptographic module 122 may determine the validity and/or legitimacy of the permissions and privileges assigned to the users of the satellite, and may determine the amount and manner of resources to assign to each of the users. For example, a first user (e.g. Owner or Operator) may generate the description of the permissions and privileges (P^P) granted to a second user (e.g. Customer), may sign the P^P, and may send the signed P^P to the second user. The second user may send the signed P^P to the satellite and, after receiving the signed P^P, the satellite may evaluate the validity of the signed P^P by authenticating the signature of the first user and, based on the description of the P^P generated by the first user, may determine which tasks and when the second user is allowed to perform.

Additionally or alternatively, the cryptographic module 122 may further associate or link the P^P granted to the identity of a user and store it, to be used at a later time for determining the amount and manner of resources assigned to each of the users. For example, a first user (e.g. Owner or Operator) may send the signed P^P to the satellite instead of sending the signed P^P to the second user (e.g. Customer). The satellite, after authenticating the signature of the first user, may link the P^P to the identity of the second user and store the linked descriptions of P^P in a TPM or database. Once the satellite receives a request from the second user, the cryptographic module 122 may determine, based on the stored descriptions of P^P linked to the identity of the users, whether or not the tasks included in the request sent by the second user may be performed. In some instances, the satellite may have a virtual machine, physical machine or application container assigned to each user, and may store in the TPM or database the descriptions of P^P linked to the identity of the user and to the virtual machine, physical machine or application container assigned to the user. So that when the satellite receives a request sent by the user, the cryptographic module 122 may determine, based on the stored descriptions of P^P, to which virtual machine, physical machine or application container sends the request. Once the operating window of the user is active, the virtual machine, physical machine or application container is turn on and the virtual machine, physical machine or application container (e.g. using a cryptographic module) may determine the amount and manner of resources assigned to the user and decide which tasks included in the request may be performed. By operating in this manner, the satellite can grant and limit the resources assigned to each user, respecting the permissions imposed by the user assigning the permissions and privileges.

In some implementations, the cryptographic module 122 may evaluate a chain of permissions or delegated permission in order to determine the validity and/or legitimacy of the permissions and privileges assigned to the users of the satellite, and may determine the amount and manner of resources to assign to each of the users. For example, the first user (e.g. Owner or Operator) may generate the description of P^P granted to a second user (e.g. Customer), wherein the P^P includes the permission granted to the second user to reassign its permissions, or a subset of its permissions, to one or more third users (e.g. members of the infrastructure of the Customer). The one or more third users may send requests to the satellite including in the request the signed P^P granted to the second user, so that the satellite may authenticate the signature of the first user granting the P^P to the second user, and may determine whether or not the permissions include the authorization of delegating permissions to one or more third users, in order to determine the satellite resources that needs to allot to the one or more third users. As explained above, the first user and/or the second user may additionally or alternatively directly send the signed P^P to the satellite, granting permissions to the second user and grant permission to one or more third users, instead of sending the signed P^P to the second or one or more third users. Also, the satellite may assign a virtual machine, physical machine or application container for each of the users (e.g. second user) and sub-users (e.g. one or more third users), so that when the user assigns permissions to the sub-users, all is handle by the virtual machine, physical machine or application container assigned to the user. The virtual machine, physical machine or application container of the user may in turn assign a virtual machine, physical machine or application container to each of the sub-users.

The payload module 124 is primarily responsible for sending instructions to the hardware components of any of the payload(s) 104 and the sensors included in the payload(s) 104, for capturing data. For example, the payload module 124 may send instructions to an imaging payload comprising an imaging sensor such as a multispectral camera, a hyperspectral camera, a radar or SAR sensor system, for capturing imaging data. The payload module 124 may further include instructions for collecting, storing, cataloging, timestamping collected data (e.g. images), among other things, as well as, determining exposure, amplification gains, and image statistics in instances involving an imaging payload. To include further examples, the payload module 124 may send instructions to the hardware components of a gas detection payload system, a radio or optical communications payload system, an RF payload system, a custom-built payload system, an energy generation module, or any other payload system on-board a satellite. The payload module 124 may further include instructions for selecting communication channels, filtering incoming signals, discarding disallowed uses, or performing any action related to the acquisition of signals. The payload module 124 may also include instructions to direct an RF receiving sensor from an RF payload system to select a frequency range, select an antenna element, measure signal's phase and time and save the data for further analysis, or perform any action related to the acquisition of RF data.

The payload module 124 may further include instructions for processing the data generated by the payload(s) 104 and corresponding sensors. For example, the payload module

124 may further include instructions for processing the image data captured by an imaging payload in order to improve the quality and/or properties of the images, including performing syntactic transformations on the images, such as segmenting, stitching, correcting, or rectifying the image data. Image processing instructions may further include, but are not limited to, tone mapping to generate HDR images, resolution enhancement algorithms to produce high-resolution images, stitching algorithms to generate images from multiple partially overlapping exposures, blur removal, artifact removal, color enhancement, cropping, image conversion, image compression, and so forth. In other examples, the payload module 124 may further include instructions for processing the gas detection data measured by a gas detection payload in order to obtain gas concentration data, instructions for processing the data acquired by a custom-built payload, instructions for processing the signals transmitted and/or received by a radio or optical communications payload system, instructions for processing RF data, and so forth. For instance, the payload module 124 may be configured to process the data received and/or transmitted by the radio or optical communications payload system, by de/modulating, de/compressing, de/encoding, de/encrypting the signals; and may be further configured to detect transmissions, decode messages, determine RF usage, and so forth.

In some instances, the satellites are equipped with significant processing capabilities and the payload module 124 may be further configured to perform analysis to the acquired data. For example, the payload module 124 may be configured to perform image analysis and may include algorithms that allow the payload module 124 to perform any suitable image analysis to the captured images, such as, for example, object detection, edge detection, feature recognition, object identification, cloud detection, segmenting an image into sub-images, among others. In other examples, the payload module 124 may be configured to extract or compute derived information for example by analyzing and looking for patterns or signals in received signals from the radio or optical communications system. The payload module 124 may be further configured to correlate received RF signals with other parameters to develop, for example, RF-spectrum usage mapping such as georeferenced heatmaps from RF data by correlating pixel by pixel the obtained RF data with a georeferenced geographical area, and so forth.

In some instances, the data acquisition, the data processing and the data analysis may be handled by separate modules. For example, image acquisition may be handled by the payload module 124, the data processing may be part of a separate processing module configured to process data from the sensors on-board the satellite, and the data analysis may be part of a separate analysis module configured to extract meaningful data from the data captured by any of the sensors on-board the satellite, such as the image data captured by an imaging sensor.

In some instances, the acquisition of sensor data, such as image capture or gas detection, may be performed on-board the satellite, and some (or all) of the sensor data processing and/or sensor data analysis may be performed off-board the satellite. The processing and analysis capabilities may be shared between multiple satellites within a constellation, or between a satellite and a ground-based station. In some instances, the sensor data processing and/or sensor data analysis may include instructions uploaded to the satellite. The instructions for data processing and/or data analysis may have been uploaded before launching the satellite and stored for later execution, but in some instances the instructions for data processing and/or data analysis may be uploaded from the ground or by another spacecraft (e.g. satellite). In addition, the sensor data processing and/or analysis instructions may be specific to a particular task that the satellite has been tasked to complete.

While the modules have been described as having, in some instances, discrete functions and duties, in some instances there are tasks that may be common to all modules. For example, receiving telemetry data and monitoring the health and status of the satellite are functions that may be shared between some (or all) of the modules described herein. The cooperation between modules and subsystems allows the modules and subsystems to cooperate to exchange data for monitoring the health and status of the satellite, on-board evaluation, reprioritizing tasks, image selection, augmenting sensors, activating or deactivating various payloads, extracting higher level meaning, performing analytics, and automated tasking, among other things.

Figure 2:
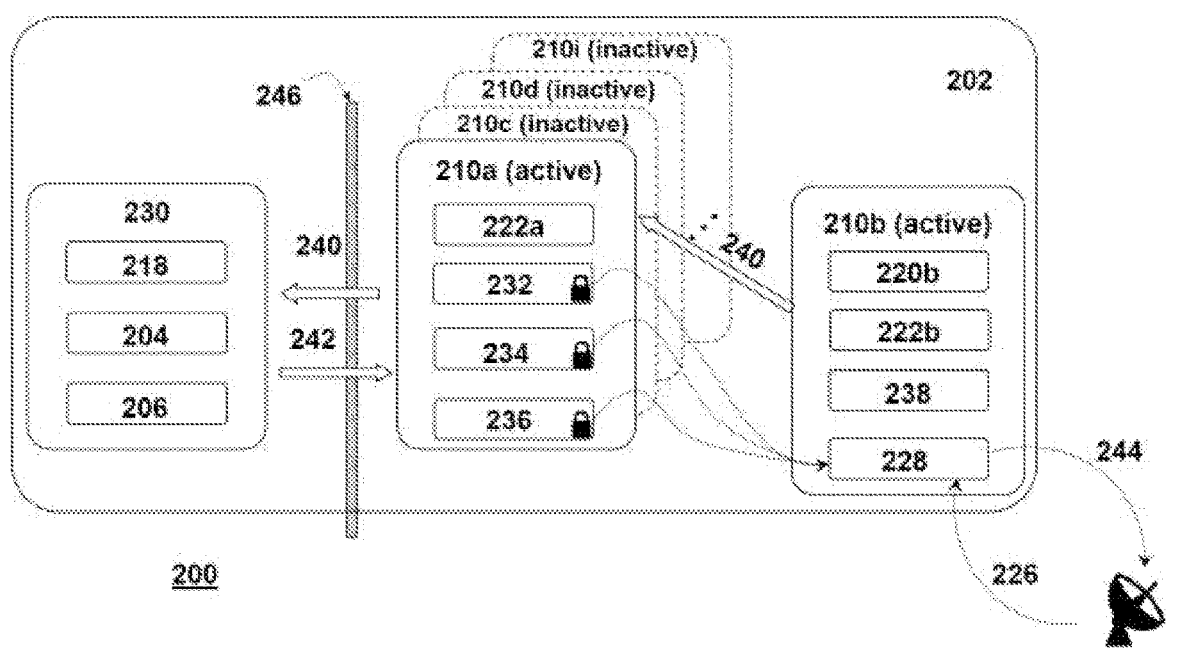
FIG. 2 is a block diagram of an example system that provides on-board user hardware isolation, according to embodiments of the present disclosure.

FIG. 2 is a block diagram of an example system 200 according to embodiments of the present disclosure, to provide on-board user hardware isolation. The system 200 comprises a satellite 202. The satellite 202 may comprise, depending on the number of users registered with the satellite 202, (physical and/or virtual) on-board computers 210a, 210b, 210c, 210d, 210i, and so forth, one for each user (owner, operator, customer, satellite in the constellation, and so forth) of the satellite 202. In some instances, there is only one user on-board computer operating at a time. The on-board computers may be started and stopped by a scheduling or plan executor which may be in the same or another on-board computer. Although not shown, some modules like the scheduling module or cryptographic module may be present in some or all of the on-board computers assigned to the users and/or may be executed in the on-board computer assigned to the satellite 202. A customer may upload encrypted task(s) 226 to the satellite 202. The encrypted task(s) 226 may be received by a communication module 228 executed by Operator on-board computer 210b which represents an on-board computer assigned to an operator. The Operator on-board computer 210b may verify, through the cryptographic module 222b that the encrypted task(s) 226 are properly signed (identity of the customer and integrity of the encrypted task(s)) and, using scheduler 220b, may assign the encrypted task(s) 226 to the customer on-board computer 210a which represents an on-board computer assigned to a customer, so that the task(s) may be executed by the customer on-board computer 210a, for the extent or during the operating window assigned to the customer. During the operating window, the Customer on-board computer 210a may decrypt the received encrypted task(s) 226, for example using cryptographic module 222a and, based on any number of factors or combinations of factors, may evaluate whether or not to execute the decrypted tasks. For example, if Customer on-board computer 210a determines that it is not the time to execute the decrypted task(s) (because of obstructions to the area or object of interest, limited satellite resources, and so forth) and no other task or request previously decrypted and stored is pending, the customer on-board computer 210a may do nothing and wait until it is the right moment to execute the received instructions (task(s)), and may even turn off the customer on-board computer 210a, to turn it on again on the next assigned operating window. If the Customer on-board computer 210a determines that the decrypted task(s) may be executed, the Customer on-board computer 210a may need access to direct the hardware 230 for example to acquire raw data 232 using one or more payloads 204 and/or sensors 206. The access to direct the hardware 230 may be allowed or not based on the permissions assigned to the customer, and may be executed only if authentication and authorization are granted by the satellite 202. The security and evaluation check 246 may determine the flow between hardware/satellite resources access 240 and information 242 between the Customer on-board computer 210a and hardware 230. Once access to the hardware 230 is granted, the Customer on-board computer 210a may have full control of the payload(s) 204, sensor(s) 206 and bus hardware 218, up to some security threshold. The Operator on-board computer 210b may access the hardware 230 and satellite resources mediated by the active user i.e. the Customer on-board computer 210a. Also, the Operator on-board computer 210b may receive and subsequently store updates in updates module 238 but the Customer on-board computer 210a may decide whether or not to install the updates on its on-board computer. In some instances, the Customer on-board computer 210a may analyze the raw data 232 to produce analysis results 234. The Customer on-board computer 210a may collect raw data 232, analysis results 234 and/or metadata 236 and store them for later transmission to the customer on the ground. The Customer on-board computer 210a may also encrypt, using the cryptographic module 222a, the raw data 232 analysis results 234 and/or metadata 236 before storing them, or before transmitting them to the ground through the communication module 228 executed by the Operator on-board computer 210b. As indicated above, any instruction may be executed by the Customer on-board computer 210a if it is allowed, based on the privileges, permissions and operating window assigned to the customer, so that only authenticated and authorized actions may be performed by the satellite 202. Any message 244 including raw data 232, analysis results 234 and/or metadata 236 resulting from the decrypted tasks may be encrypted by the Customer on-board computer 210a and may be signed (either by cryptographic module 222a or 222b) with a cryptographic key of the satellite 202 to be able to prove the message 244 is actually coming from the satellite 202. The Customer on-board computer 210a may enqueue and instruct the communication module 228 to send the message 244 to the ground or where the customer is located. The Operator on-board computer 210b is authorized and accesses the communications hardware to transmit the message 244, but it is not allowed to access the payloads 204 or other critical components while the Customer on-board computer 210a is performing a requested task. The Operator on-board computer 210b may control communications (message download), schedules, software updates and some other housekeeping operations, but may not have access to communication busses or hardware. However, in some instances, the Operator on-board computer 210b may access low level resources mediated by the Customer on-board computer 210a, and all mediated activity is registered (e.g. logged) and the registered information (e.g. logs) may be downloaded for the customer to be able to audit, if desired. By providing user hardware isolation the satellite tasking system helps to avoid leakage of status information through hardware back-channels, offering a safe and private system.

Figure 3:
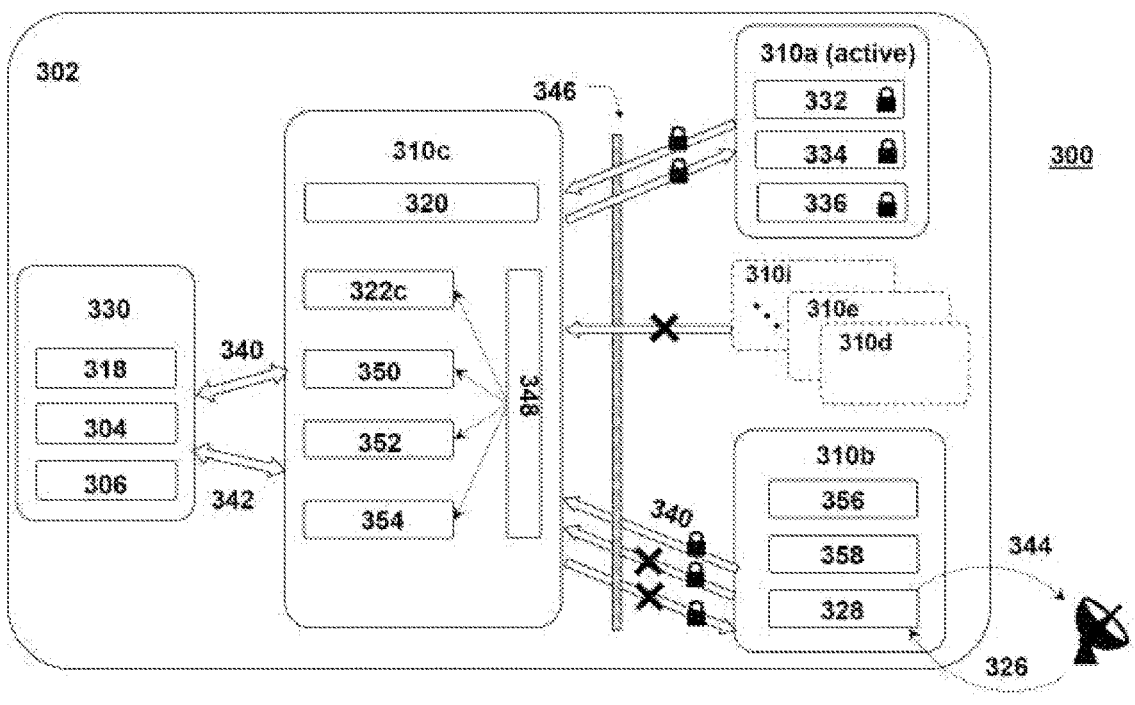
FIG. 3 is a block diagram of an example system that provides user side-channel protection, according to embodiments of the present disclosure.

The system also provides additional security measures to prevent other users from gaining knowledge about confidential tasks or information associated with the use of the satellite resources by one user, while on-board the satellite. FIG. 3 is a block diagram of an example system 300, according to embodiments of the present disclosure, to provide user side-channel protection. The system 300 comprises a satellite 302 having (physical and/or virtual) on-board computers 310*a* to 310*i*, depending on the number of users. The Owner on-board computer 310*c*, corresponding to an on-board computer assigned to an Owner of the satellite, may have full and exclusive hardware and resources access 340 to the hardware 330 and other satellite resources including the payload(s) 304, sensor(s) 306 and bus hardware 318, and to information 342. The control module 320 of the Owner on-board computer 310*c* may have simple and stable instructions (e.g. software) executable by the one or more processors that are expected to rarely change, and are configured to control the operations of the Owner on-board computer 310*c* and the access to the hardware 330 and other satellite resources. Conversely, the processors of the Operator on-board computer 310*b*, Customer on-board computer 310*a* and/or other User on-board computers 310*d* to 310*i* may execute instructions which may be frequently updated with software updates.

A customer may send an encrypted request 326 to the satellite 302. The customer may additionally or alternatively encrypt other types of information to be sent to the satellite such as tasks, files, configurations, plans, software updates, VM images, and so forth. In some instances, the request or information may be encrypted using the public keys of private/public key pairs previously generated and distributed by ground-based and/or space-based users such as the satellite, operator, customer, satellite subsystem, and so forth. The customer may choose to encrypt for the satellite (e.g. using the satellite's public key) or to encrypt for a particular computer on-board the satellite (e.g. using the user's public key). For example, the customer may choose to encrypt for the Customer on-board computer 310*a* so that only the Customer on-board computer 310*a* may decrypt the information or request, and all private content is isolated inside the Customer on-board computer 310*a*. While the customer's assigned window is active, the Customer on-board computer 310*a* may execute the request or instructions included in the information. On the contrary, if the customer chooses to encrypt for the satellite by using the satellite key to encrypt the request or information, the Operator's on-board computer 310*b* may decrypt and/or execute the request and instructions included in the information. Likewise, any user may choose to encrypt for the satellite or for any of the User on-board computers 310*d* to 310*i*, so that all the content of the encrypted request or information is privately isolated, decrypted and/or executed by the selected User on-board computers 310*d* to 310*i*. By operating in this manner, it is possible to prevent the satellite from knowing the user's plans in advance, e.g. the satellite will not be able to know that a user will activate a payload in the future, providing confidentiality for scheduled plans and instructions.

The Operator on-board computer 310*b* may receive the encrypted request 326 for example through communication module 328 executable by the processor of the Operator on-board computer 310*b*. Any access to the hardware 330 and other satellite resources by the Operator on-board computer 310*b* is mediated by the Customer on-board computer 310*a* while the customer is active (e.g. while the customer is assigned an operating window and the operating window is active). Nonetheless, the access to the hardware 330 and/or other satellite resources is ultimately mediated by the Owner on-board computer 310*c*. Before being able to access the hardware 330 and/or other satellite resources, the security and authorization checkpoint 346 determines whether or not the Operator on-board computer 310*b*, the Customer on-board computer 310*a* and/or any other User on-board computers 310*d* to 310*i* are authorized to access the hardware 330 and satellite resources (mediated by the owner on-board computer 310*c*), and also the level of permissions and privileges granted to each one of them. In some instances, the Owner on-board computer 310*c* controls the security and authorization checkpoint 346, and may use information stored in the satellite 302. In other examples, a control module of the satellite 302 may control the security and authorization checkpoint 346 based on stored information about the users, such as permissions and privileges previously received and stored in a secured TPM by the satellite 302.

The Owner on-board computer 310*c* may expose the hardware 330 and other satellite resources to other user on-board computers using computing interfaces. For example, the Owner on-board computer 310*c* may expose the hardware 330 and/or other satellite resources using application programming interfaces (APIs) through an API broker 348 to the Operator on-board computer 310*b*, to an active Customer on-board computer 310*a* (i.e. using the satellite during its operating window), and other User on-board computers 310*d* to 310*i* when the operating window of the inactive users becomes active. For some APIs, there may be only one registered user at a time. Some or all the APIs may be authenticated and authorized to grant only access to some users. The API broker 348 may authenticate and authorize APIs for some users and on some specific circumstances where the use of the resources associated with the APIs are allowed such as particular time windows, specific geographical areas, quotas or usage limitations, and so forth. For example, the Customer on-board computer 310*a* that is active may access the APIs whereas the other User on-board computers 310*d* to 310*i* may not be granted access since these are inactive (e.g. not within their operating window). Also, some APIs may not be available to the Operator on-board computer 310*b*, like those APIs that may let the Operators infer other users' actions, for example, using metadata. After receiving the encrypted request 326, the Owner on-board computer 310*c* may expose the cryptographic API 322*c* so that the Customer on-board computer 310*a* (active user) may authenticate and decrypt the encrypted request 326, and may provide the payload API 350 so that the Customer on-board computer 310*a* may direct the hardware 330 to acquire raw data 332 and/or produce analysis results 334 based on the raw data 332. The Owner on-board computer 310*c* may also provide storage API 352 such as a Trusted Platform Module (TPM) or other secure storage mechanism, which may also be under the exclusive control of the Owner on-board computer 310*c*, so that the Customer on-board computer 310*a* may store the raw data 332, analysis results 334 and/or metadata 336, using storage API 352. Additionally or alternatively, the Customer on-board computer 310*a* may register for logging and telemetry API 354 provided by the Owner on-board computer 310*c*. As used herein, logging refers to a means of tracking events that happen when some software runs. The use of the logging and telemetry API 354 may be exclusive, consequently if for example the Customer on-board computer 310*a* has access to it, no other on-board computer is collecting metadata. The Owner on-board computer 310*c* may also expose the cryptographic API 322*c* so that the Customer on-board computer 310*a* (active user) may encrypt and sign the raw data 332, analysis results 334 and/or metadata 336, and may send the signed and encrypted message 344 using the cryptographic API 322*c* provided by the Owner on-board computer 310*c*. The Customer on-board computer 310*a* may enqueue (placed into one or more message queues) and instruct the communication module 328 to send the signed and encrypted message 344 to the ground or where the customer is located. In other instances, the Customer on-board computer 310*a* may use its own modules (cryptographic, payload, storage and so forth), executed by the Customer on-board computer 310*a*. In some implementations, the upload and download traffic is handled by the Operator on-board computer 310*b*. For each user on-board computer (e.g. Customer on-board computer 310*a*, Owner on-board computer 310*c*, other User on-board computers 310*d* to 310*i*) there may be an incoming storage 356 and an outgoing storage 358 in the Operator on-board computer 310*b*. For example, when Customer on-board computer 310*a* starts or restarts, it may read the incoming storage 356 in order to read the received instructions such as instructions to execute tasks, capture payload data, update software, and so forth. All the data generated by a Customer on-board computer 310*a*, such as raw data 332, analysis results 334 and/or metadata 336, may be stored in the outgoing storage 358. The Operator on-board computer 310*b* takes data in the outgoing storage 358 and enqueues it for downloading. The Customer on-board computer 310*a* may encrypt and sign data, if desired by the customer. In some instances, the Operator on-board computer 310*b* may sign the data, if desired by the customer.

FIGS. 4 to 10 depict flow graphs that show example processes in accordance with various embodiments. The operations of these processes are illustrated in individual blocks and summarized with reference to those blocks. These processes are illustrated as logical flow graphs, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. In the context of hardware, the operations may be carried out in a virtual computer, in a physical computer, in an on-board computer, in a ground-based computer, in an integrated circuit, such as in an application specific integrated circuit (ASIC), in a programmable logic device, such as a field programmable gate array (FPGA), or other device. The order in which the operations are described is not intended to be construed as a limitation, and any number of the described operations can be combined in any order, separated into sub-operations, and/or performed in parallel to implement the process. Processes according to various embodiments of the present disclosure may include only some or all of the operations depicted in the logical flow graph.

Figure 4:
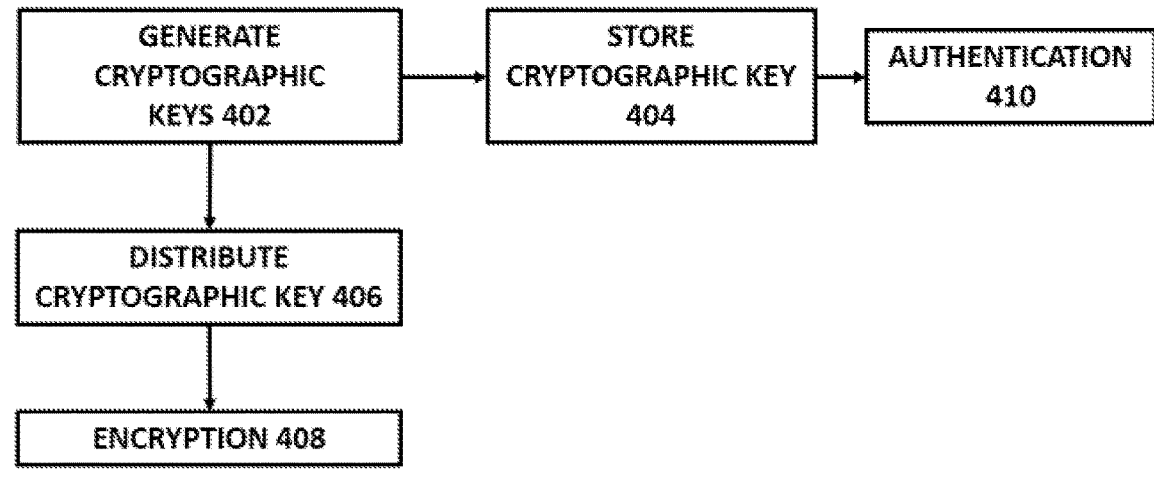
FIG. 4 illustrates an example flow diagram for cryptographic operations, according to embodiments of the present disclosure.

FIG. 4 illustrates an example flow diagram for cryptographic operations, according to embodiments of the present disclosure. At 402, cryptographic keys are generated. The cryptographic keys may be generated using a variety of symmetric and public-key cryptography algorithms and protocols. The generated cryptographic keys may include encryption keys and authentication keys for encrypting or signing data, results and/or requests that are exchanged between the users and the satellite. The keys may be generated by the satellite and by any (some or all) of the users of the satellite system. For example, the cryptographic module 122 of the satellite 102 may comprise an on-board Trusted Platform Module (TPM) and may generate the cryptographic keys during commissioning after launch. Alternatively or additionally, the cryptographic keys may be generated on the ground and may be stored in the satellite before launch. In some instances, the cryptographic keys may also be wrapped (encrypted) or sealed to be subsequently unwrapped (decrypted) or unsealed when particular hardware or software conditions are met, to add a further protection mechanism.

At 404, cryptographic keys are stored. For example, the TPM may be configured to generate a satellite's public-private key pair and may store the satellite's private portion of the key in the TPM, or in a memory only accessible by the satellite, which in some instances, may be physically or virtually separated from the memory that is controlled by the users' on-board computers 110 such as the Owner computers, Operator computers, Satellite computers, or Customer computers. Similarly, a Customer may generate a customer's public-private key pair and may store the customer's private portion of the key in any computer-readable media (storage or memory). In some instances, the private portion of the key may never be exposed to other components, software, processes or users.

At 406, the cryptographic key or a portion of the cryptographic key is distributed among the users of the satellite system. For example, after generating a private-public key pair, the satellite 102 may distribute the satellite's public portion of the key among the users such as operators, customers, satellites, subsystems, payloads, owners, or any other entity capable of using satellite resources. In a similar manner, after generating a private-public key pair a Customer may share the customer's public portion of the key with the Owner or Operator of the satellite system, or with the one or more satellites allocated to the Customer according to its assigned operating window.

At 408, the cryptographic key or a portion of the cryptographic key may be used for encryption. For example, a symmetric key or the public portion of the key may provide means for encrypting the request and/or satellite data for encoding the information so that only authorized parties may decrypt the message. For instance, a Customer may generate a public-private encryption key pair or a symmetric encryption key, and may deliver the public portion of the key or the symmetric key to the Satellite 102. If the Customer sends a symmetric key, the symmetric key may be encrypted with the satellite's public key so that only the Satellite 102 may decrypt the received customer's symmetric key. The keys may be transmitted and stored on-board the Satellite 102 once, or may be generated each time the Customer wants to communicate with the Satellite 102. The encryption keys may be sent to Satellite 102 associated with a request comprising tasks to be performed by the Satellite 102. After receiving the request, the Satellite 102 decrypts the request, checks the customer's permissions, and executes the task(s) included in the request. The Satellite 102 may subsequently encrypt all produced satellite data, including raw data and results, with the key associated with the request. The encryption keys associated with the request may be the customer's public portion of the key and/or the symmetric encryption key encrypted with the customer's public key. Once a communication link is established, the Satellite 102 may transmit the encrypted satellite data to the Customer, routing the satellite data by any means such as one or more ground stations, public networks, internet, and so forth. In some instances, after receiving the encrypted satellite data, the Customer may decrypt the encrypted satellite data using the customer's private portion of the key. The encrypted satellite data containing the customer's public portion of the key may only be decrypted by the customer having the customer's private portion of the key. In some instances, instead of satellite data, the Customer may want to receive from the Satellite 102 the metadata associated with the request sent by the Customer and/or any metadata generated while the Customer was using the satellite resources, e.g. for the extent of the operating window assigned to the Customer. Consequently, the Satellite 102 may encrypt the metadata associated with the Customer and may also send it to the Customer. The Customer may decide to share the metadata with the Operators, or to summarize or subsample the metadata before sharing it with the Operators, providing additional means to control the privacy of the Customer. By operating in this manner, users may send encrypted requests and the satellite may send encrypted satellite data (e.g. raw data or results) or metadata ensuring privacy, authentication and confidentiality of the request, data and metadata, and nobody except the parties involved have access to the content of the request, data or metadata.

At 410, the cryptographic key or a portion of the cryptographic key may be used for authentication. For example, the Satellite may create an authentication code using the satellite's private portion of the key (e.g. a tag or digital signature), and may sign the satellite data to be transmitted to a Customer on the ground, so the Customer having the satellite's public portion of the key may verify the digital signature added to the satellite data and determine whether or not the data is received from a trustful source, i.e. from the Satellite 102 belonging to the satellite system, and whether or not the message has been tampered with or altered regardless of the route the data took to arrive to the Customer. Similarly, the Customer may sign the request to be sent to the Satellite 102 adding a tag or digital signature created using the customer's private portion of key, so that when the Satellite 102 receives the signed request may determine the identity of the Customer and may subsequently check whether the Customer is an authorized user, for example by checking against a list of all customer's public keys stored in the Satellite 102. Additionally, the Satellite 102 may also determine with the added tag or digital signature whether the request has been modified or transformed in any manner along its routing path from the Customer to the satellite. By providing means for determining the origin and integrity of the request and the identity of the user, the satellite system provides a robust and secure system which allows tasking the satellite and retrieving information in a private and safe manner.

Figure 5:
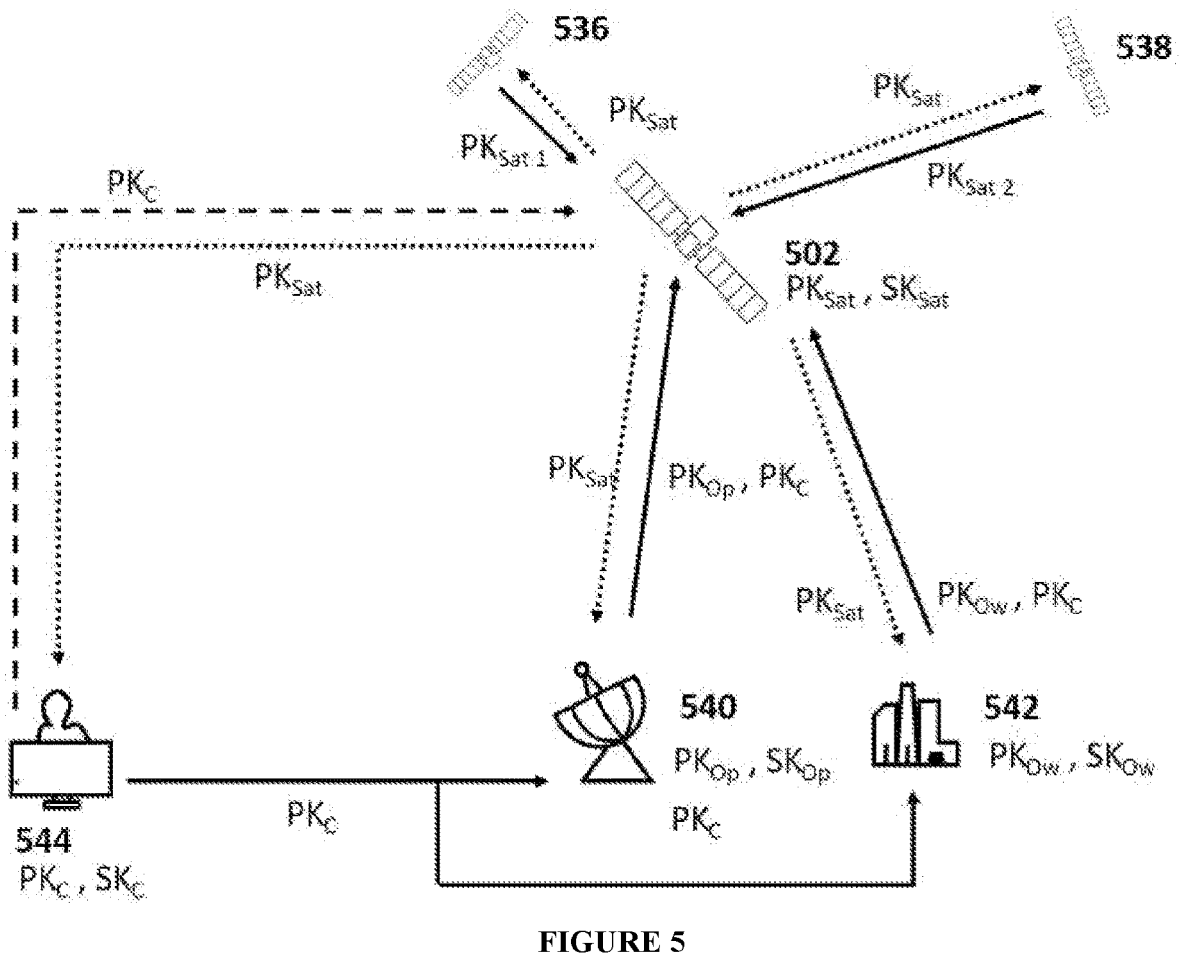
FIG. 5 illustrates a pictorial flow diagram for cryptographic key distribution, according to embodiments of the present disclosure.

FIG. 5 illustrates a pictorial flow diagram for cryptographic key distribution, according to embodiments of present disclosure. The satellite 502 may generate a set of authentication and encryption keys. In some instances, the keys include a public-private key pair having a public key portion $PK_{Sat}$ and a private key portion $SK_{Sat}$. If the keys are generated during commissioning or once in orbit, the satellite 502 may store $SK_{Sat}$ in a memory only accessible by the satellite and distribute $PK_{Sat}$ among one or more users such as satellites 536 and 538, operator 540, owner 542 and customer 544. Alternatively or additionally, the keys may be generated by the satellite 502, owner 542 or operator 540 on the ground, and in instances in which the key comprises a public-private key pair, the owner 542 may store and distribute $PK_{Sat}$ to other users of the system, whereas $SK_{Sat}$ remains in the satellite 502 only accessible by the satellite. $SK_{Sat}$ may never be exposed to other components, software, processes or users, but may be used in verification and authentication processes, in order to create and/or add additional protection layers. Similarly, the customer 544 generates a set of authentication and encryption keys, and when the keys include a public-private key pair, the customer 544 stores the private key portion $SK_C$, and sends the public key portion $PK_C$ to the users, such as the operator 540, the owner 542, and the satellites 502, 536 and 538. The customer 544 may directly send $PK_C$ to the satellites 502, 536 and 538, or may send $PK_C$ to the operator 540 or owner 542, and the operator 540 or owner 542 sends $PK_C$ to the satellites 502, 536 and 538. The operator 540 may have a key pair with public portion $PK_{OP}$ that shares with the satellite 502 and may store the private portion $SK_{OP}$ in a computer-readable media (eg. memory or storage). The owner 542 may also have a key pair with public portion $PK_{Ow}$ that shares with the satellite 502 and private portion $SK_{Ow}$ stored in a computer-readable media (eg. memory or storage). Additionally, each of other satellites which may communicate with the satellite 502 may have a key pair and may keep the private portion of the key stored in their memory (e.g. $SK_{Sat1}$, $SK_{Sat2}$) and send the public portion of the key (e.g. $PK_{Sat1}$, $PK_{Sat2}$) to satellite 502. By generating and distributing cryptographic keys among the satellite and users, the system provides means for authenticating and encrypting communications providing a secure, private and safe system.

Figure 6:
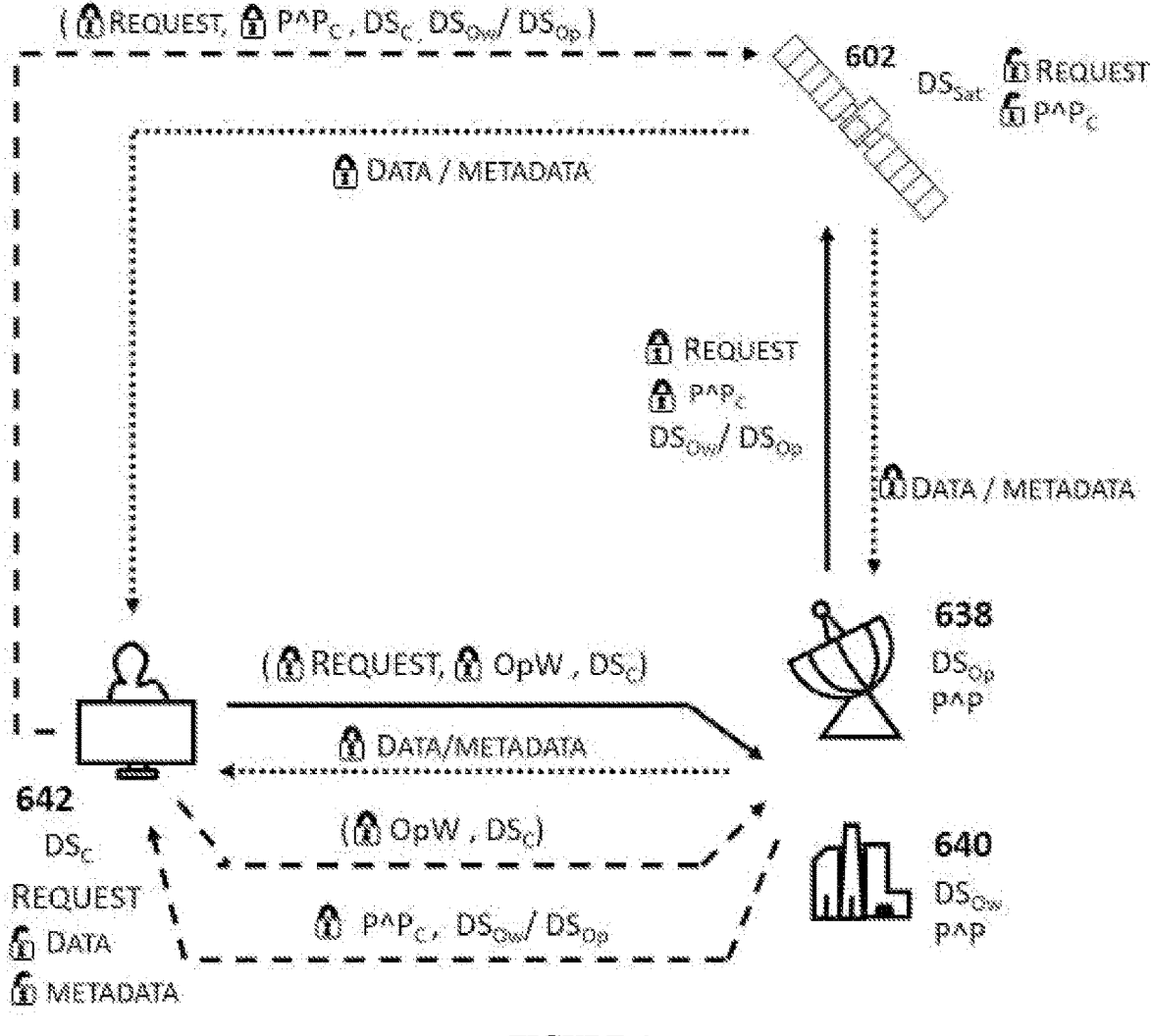
FIG. 6 illustrates a pictorial flow diagram for implementing cryptographic and security-in-depth techniques on-board satellites, in accordance with embodiments of present disclosure.

FIG. 6 illustrates a pictorial flow diagram for implementing cryptographic and security-in-depth techniques on-board satellites in accordance with embodiments of present disclosure, providing privacy and security to users and satellites. In this figure, a simplified view of multiple possible cryptographic and security-in-depth technique implementations is illustrated. The different types of connecting lines shown in FIG. 6 are intended to represent alternative implementations between the users and the satellite. However, it should be noted that any combination of the implementations may be performed. After the generation and distribution of cryptographic keys, including encryption and authentication keys or codes, the satellite and users may exchange communications comprising one or more messages including at least one of requests, descriptions of privileges and permissions (P^P), satellite data, descriptions of operating windows (OpW), and authentication codes such as digital signatures (DS). The solid line exemplifies an implementation wherein the customer 642 may send an encrypted request and an encrypted operating window to the operator 638 and/or owner 640. The encrypted message, including the request and OpW, may be signed with the customer's digital signature ($DS_C$), so that the operator 638/owner 640 may verify the identity of the customer and the integrity of the message. The encryption allows the customer to confidentially communicate with the operator 638/owner 640. After receiving and decrypting the OpW asked by the customer 642, the operator 638/owner 640 may assign, if available, the OpW to the customer 642 by associating the permissions and privileges (P^P) to the customer 642. The operator 638/owner 640 may use any means to associate the identity of the users with the P^P. In some instances, the P^P may include the customer's public portion of a customer's private-public key pair (e.g. $PK_C$) to associate the identity of the users with the P^P. In other instances, the P^P may additionally or alternatively be linked using a fingerprint of the customer's private-public key pair or a unique user ID of the customer. The operator 638/owner 640 may generate a description of the P^P for each customer 642 once or any time the customer 642 requires a new authorization. After assigning the OpW, the operator 638/owner 640 may encrypt the P^P describing what the customer is authorized to do with the satellite resources, and may send it to the satellite 602, along with the request encrypted by the customer 642.

The operator 638/owner 640 may also add an authentication code such as a digital signature for the owner ($DS_{Ow}$) or the operator ($DS_{Op}$) so that the satellite 602 may verify that the message including the P^P are indeed sent by the operator 638/owner 640 and that the message has not been modified before receiving it. The request encrypted by the customer 642 is not decrypted by the operator 638/owner 640. The encrypted request may only be decrypted by the satellite 602, since only the satellite may know what the user asks the satellite to do. Nevertheless, before performing any action included in the request, the satellite 602 verifies the P^P assigned to the customer 602 in order to determine what actions the customer 642 is authorized to perform and what satellite resources the customer 642 is authorized to use.

The long dash line exemplifies an alternative implementation in which the customer 642 sends an encrypted OpW to the operator 638/owner 640, that in some instances, may be signed with $DS_C$ so that the operator 638/owner 640 may verify who is asking for the OpW. After determining the OpW (either agreeing with the OpW sent by the customer or modifying it), the operator 638/owner 640 generates a description of the P^P for the customer 642, encrypts the P^P, and sends the encrypted P^P to the customer 642. The encrypted P^P may also be signed by the operator 638/owner 640 using for example the $DS_{Op}$/$DS_{Ow}$ so that the customer 642 may verify the authenticity and integrity of the message. If the encrypted P^P was also signed, the customer 642, may verify that the received message comes from a trustful source and has not been altered during the transmission path. After receiving the encrypted P^P, the customer 642, may send the encrypted P^P as part of the request to the satellite 602, encrypting also the request. The encrypted message including the P^P and the request may also include $DS_C$, $DS_{Op}$ and/or $DS_{Ow}$, so that the satellite 602 may verify that the P^P was indeed sent by the operator 638/owner 640 and that the request was indeed sent by the customer 642, and the content of the P^P and request were not modified or altered before being received by the satellite 602. After receiving and decrypting the message including the P^P and request, the satellite 602 may verify whether the P^P match the request, so that the satellite 602 may execute the instructions included in the request if authorized by the operator 638/owner 640, based on the assigned OpW. In some instances, the request may include downloading satellite data and/or metadata to the customer 642, as exemplified with the dot dash line. After obtaining the satellite data/metadata instructed in the request, the satellite 602 may encrypt the data/metadata and send it either directly to the customer 642, or indirectly through the operator 638/owner 640. In either case, the encrypted satellite data/metadata may only be decrypted by the customer 642 asking for the data/metadata in the request. In any of these embodiments, a public key portion of a private-public key pair may be used for encryption. For example, the OpW may be encrypted with the public portion of the key of the operator 638/owner 640 ($PK_{Ow}$/$PK_{Op}$), so that only the owner 640/operator 638 may decrypt the OpW with their respective private portion of the key ($SK_{Ow}$/$SK_{Op}$). Likewise, the P^P and the request may be encrypted with the public portion of the key of the satellite 602 $PK_{Sat}$, so that only the satellite 602 may decrypt it with its private portion of the key $SK_{Sat}$; and the satellite data/metadata may be encrypted with the public portion of the key of the customer 642 $PK_C$, so that only the customer 642 may decrypt it. However, other encryption techniques may be used. It should be understood that even though FIGS. 5 and 6 describe ground-based users, the examples are also applicable to space-based users, or a combination of them.

The P^P may be generated after defining an OpW. The P^P may be usually generated by the Owner or Operator of the satellite, however, it may be generated by other Users as well. For example, the Owner may generate P^P authorizing Customer A to use the satellite resources within the assigned OpW by sending a signed authorization ticket to Customer A. Customer A may decide to delegate the assigned P^P by assigning the P^P to Customer B, in which case a chain of authorization is created. Customer A may decide to assign all or a partial subset of their P^P to Customer B. Based on its assigned P^P, Customer A generates and signs a set or subset of P^P and sends the signed P^P to Customer B. Customer B may use the P^P signed by Customer A to communicate and send requests to the satellite that was assigned to Customer A.

Figure 7:
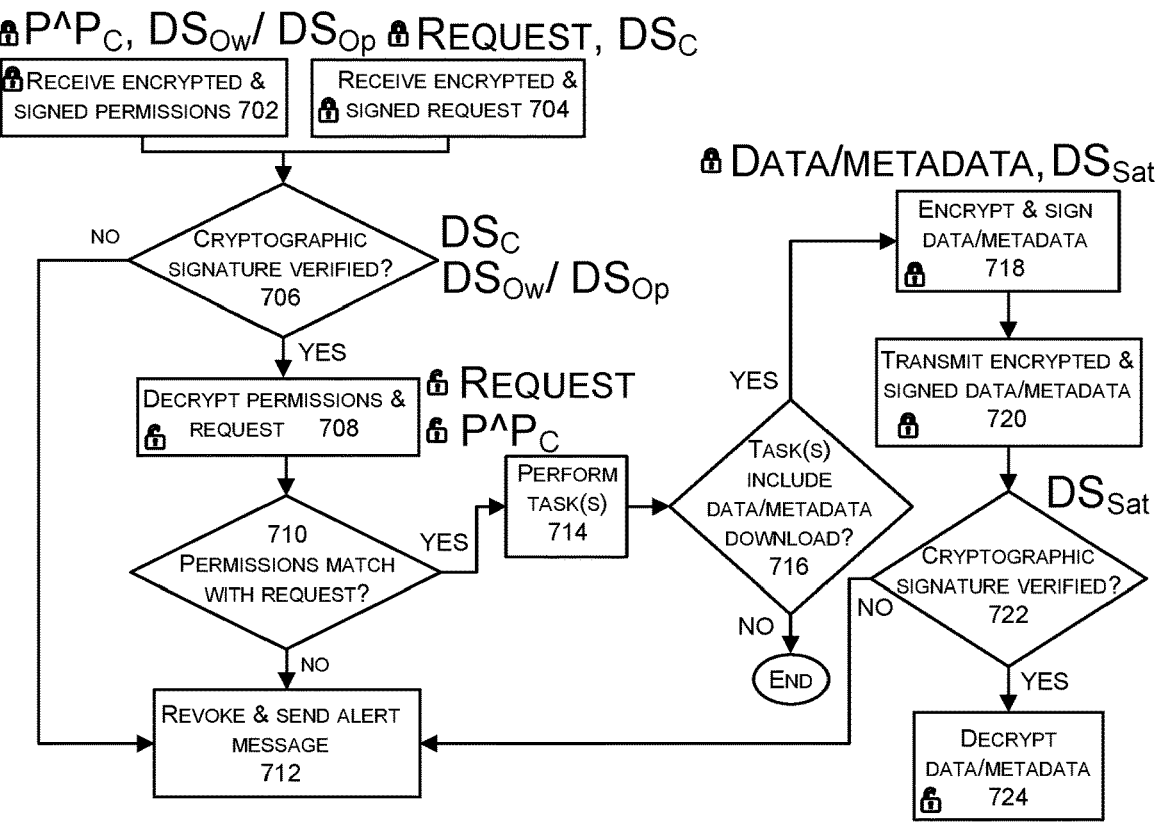
FIG. 7 illustrates an example flow diagram for implementing cryptographic techniques on-board the satellite, according to embodiments of the present disclosure.

FIG. 7 illustrates an example flow diagram for implementing cryptographic techniques on-board the satellite, according to embodiments of the present disclosure. At 702, the signed and encrypted permissions may be received by the satellite. As explained elsewhere in the Detailed Description, permissions (and/or privileges) may be signed with an authentication code and the encryption may be made by using different types of encryption keys which may be created by using encryption algorithms or a combination of hardware and software means. The satellite may store the permissions in its own on-board computer or may store it in the user's on-board computer. Any user may send permissions and the satellite may determine whether the permissions were generated by a user authorized to create the permissions. In some instances, the Owner of the satellite system may control the access of the customer and operators to the satellite(s) by sending permissions and cryptographic keys associated with each customer/operators to the satellite(s). The Owner may provide different levels of access privileges (permissions) ranging from full to partial control of satellite resources e.g satellite's payloads and modules. In some instances, a description of permissions assigned to each user may be associated with the user's public portion of the authentication token. For example, after generating an authentication token, a Customer may bid or ask for an operating window to the Owner. Once the Owner agrees to provide the operating window to the Customer, the Owner receives the customer's public portion of the authentication token. Based on the requested operating window, the Owner may generate a description of permissions for the Customer, describing the satellite resources that the Customer is enabled to use, and may link or include into the description of permissions the public portion of the authentication token provided by the Customer in order to allow a subsequent identity verification by the Satellite. In some instances, the Owner may include in the Customer's permissions the authorization to delegate permissions to one or more users. At 704, the signed and encrypted request may be received by the satellite. The request may be sent by the user who is assigned an operating window, and may be signed and encrypted by the user (or by sub-users if the user was allowed to delegate permissions). The request may be encrypted using the satellite's public portion of the key that was previously distributed among the users, so only the satellite may decrypt the encrypted request, and may be signed with the user's authentication token. For example, a Customer may generate the request, encrypt the request with the satellite's cryptographic key, may sign the request with the customer's cryptographic key, and the Operator may transmit the request to the satellite, signing the request with an operator's authentication code.

After receiving the message including signed and encrypted requests and/or permissions, at 706 the satellite verifies the cryptographic signature (e.g. tag or digital signature) to determine the identity of the users and the integrity of the message. The satellite may recognize or identify the users (e.g. customer, operator, sub-users) by being able to correlate the identity of the users with cryptographic keys stored/registered in its database. Alternatively or additionally, the identity of the users may have been registered before receiving the requests/permissions or may have been received while receiving the requests/permissions. If the satellite recognizes the user, at 708 the satellite decrypts the permissions and requests. The satellite may associate the decrypted description of permissions and the decrypted requests to the identified user, based at least on the received cryptographic keys, encrypted messages and/or operating window. With this information, at 710 the satellite may determine whether the decrypted or stored permissions match the request. In case the satellite does not find a match between the permissions and the request, i.e. if the user is not authorized to perform one or more tasks or operations included in the received request, at 712 the satellite revokes the request and may send an alert message to the owner and/or operator. The satellite may also revoke the request and send an alert message if the identity of the user does not match any user registered with the satellite. Instead, if the permissions match the request, at 714 the satellite may perform the tasks included in the request. The request may include commands comprising tasking payload operations, software upgrades, data analysis, security checks, housekeeping activities, or any other function which may be implemented by the satellite. If the task(s) include downloading data and/or metadata 716 to the user that sent the request, at 718 the data and/or metadata is encrypted, for example with the user's public key, and is signed by the satellite, for example using a tag or signature based on the satellite's private key, and at 720 the encrypted and signed data and/or metadata is transmitted to the user. Once the user receives the signed and encrypted data and/or metadata, at 722 the user may verify the cryptographic keys (e.g. the tag or signature based on the satellite's private key) attached to the encrypted and signed data and/or metadata to check whether the message has been sent by the satellite assigned to the user, and the integrity of the message, and at 724 the user may decrypt the received encrypted data and/or metadata (e.g. encrypted with the user's public key). For example, the satellite may sign the request with a tag generated using the satellite's private portion of a key pair, and the user may check the identity of the satellite because the user has the satellite's public portion of the key pair. If the message was altered or the message was sent by a man-in-the middle, the user may revoke the reception of the message and send an alert message to the owner or operator of the satellite system (712). On the contrary, if the data/metadata has not been altered while being transmitted from the satellite to the user and the data/metadata was sent by the assigned satellite, the user may decrypt the data/metadata. After verifying the authenticity and integrity of the data/metadata, the user may decrypt the data/metadata that was encrypted by the satellite using the user's public portion of the key, so that only the user having the user's private portion of the key may decrypt it. In some instances, the steps of decrypting may be performed before checking the authenticity and/or integrity of the message. The processes illustrated in FIG. 7 may be particularly useful, for example, in situations in which the users of the satellite want to task a satellite system in a confidential and secure manner, allowing to keep secret and confidential the purpose and extent of the activities performed by the satellite for the scope of the operation window. The processes illustrated in FIG. 7 may also be implemented using hardware isolation as described in FIG. 2 and side-channel protection as illustrated in FIG. 3.

Figure 8:
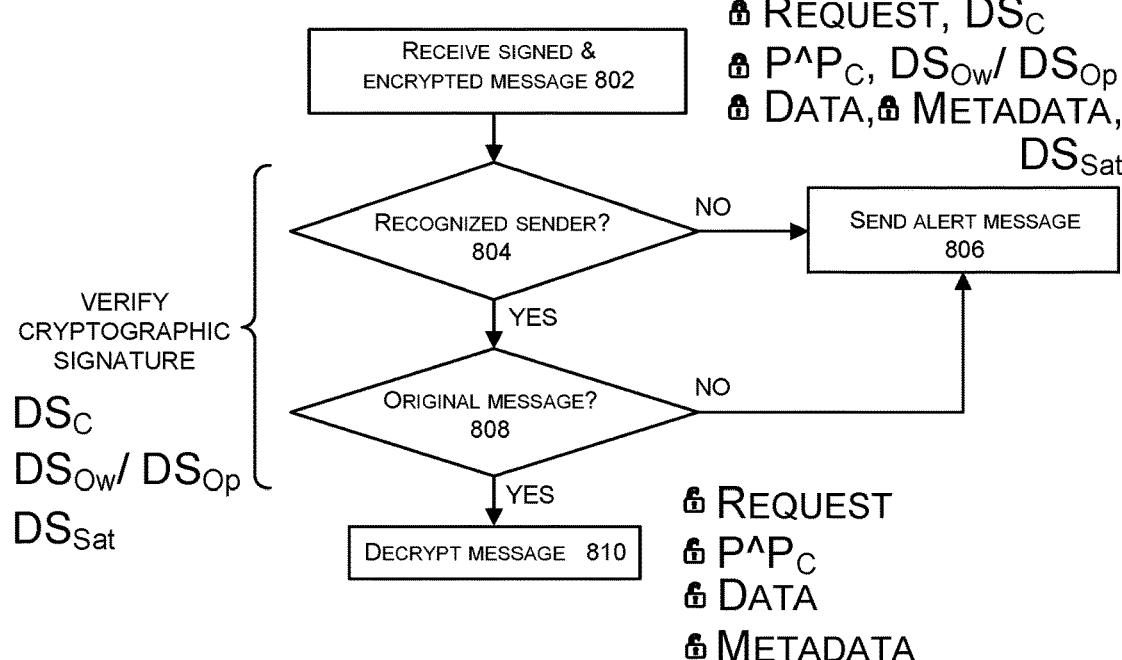
FIG. 8 illustrates an example flow diagram for verifying the origin and integrity of a communication and the identity of the users, according to embodiments of the present disclosure.

FIG. 8 illustrates an example flow diagram for verifying the origin and integrity of a communication and the identity of the user, according to embodiments of the present disclosure. At 802 an encrypted and signed message is received. For example, a Satellite may receive an encrypted request signed by a Customer with $DS_C$ or encrypted permissions and/or privileges signed by the Owner with $DS_{Ow}$ or Operator with $DS_{Op}$. Also a Customer may receive encrypted data or metadata signed by the Satellite with $DS_{Sat}$. At 804 the identity of the sender of the message is verified. For example, a Satellite may have registered a list of users, so when an authentication token is received, the Satellite may check against a list of registered users. Also, the Satellite may verify the identity of the user by decrypting part of the message sent by the user, wherein that part of the message contains a form of identifying the user. For instance, the Customer may encrypt a label to identify him as a user and may encrypt it with the satellite public portion of the satellite's private-public key pair so that the Satellite may decrypt the message with the satellite private portion and find the label identifying the Customer. If the sender of the message is not identified, at 806, an alert message is sent. On the contrary, if the sender of the message is identified, at 808, the integrity of the message is verified. For example, the Satellite may apply any message authentication code (MAC) protocol or algorithm, or other suitable technique, in order to ensure that a request received by a Customer is the same as it was created by the Customer, and has not been intentionally or unintentionally changed or altered throughout the transmission. If the message has not been altered or modified, at 810 the message is decrypted. For example, a request for tasking the satellite or a user's assigned permissions and privileges may be decrypted by the satellite, and likewise, the data and metadata sent by the satellite may be decrypted by the customer that had sent a request to the satellite.

Figure 9A:
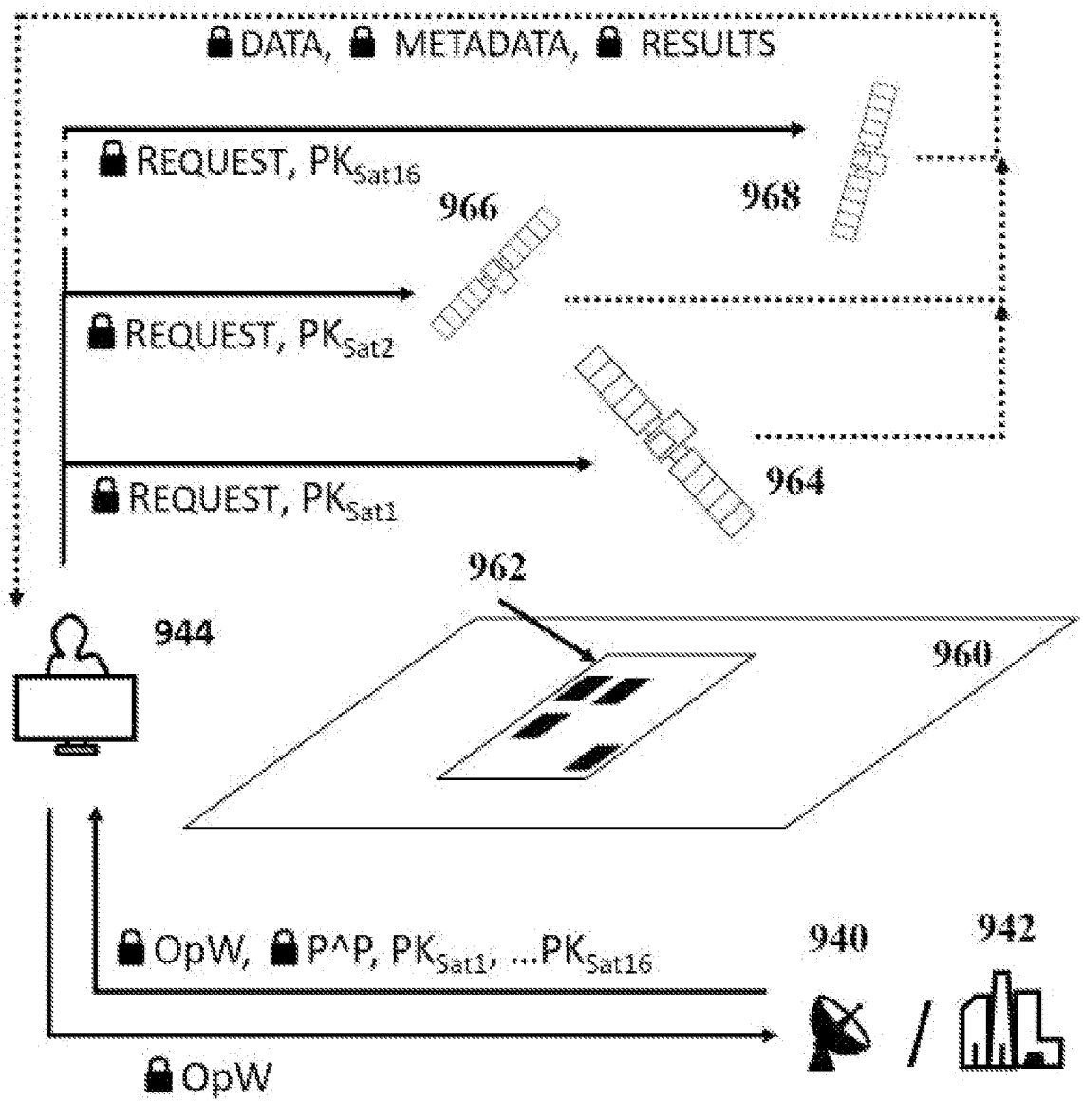
FIGS. 9A and B illustrate pictorial flow diagrams for multiple satellite operations, according to embodiments of present disclosure.

FIG. 9A illustrates a pictorial flow diagram for multiple satellite operations, according to embodiments of present disclosure. The user may be assigned an operating window which includes the use of the resources of more than one satellite, so the user has the public key of each of the satellites included in the operating window. Thus, the user may send the same or a different request to each satellite, encrypting the request with each corresponding satellite public key. For example, a customer 944 may want to monitor a geographical area throughout a whole day, so asks for an operating window including these requirements but without disclosing confidential information such as the exact location, the payload or the precise time of the day. Thus, the customer 944 may ask for an operating window OpW requiring full operating control of the satellites passing over a city 960 24 hs a day, without disclosing the intention to monitor the number of cars in a parking lot 962 to correlate the number of cars with the commercial activity of a shop while it is open to the public (e.g. from 8 AM to 6 PM). Based on the requested OpW, the owner 942 or operator 940 assigns the OpW to the customer 944 and generates a description of permissions comprising the exclusive use and control of 16 satellites over the specified city 960 24 hs a day for one year, and sends the encrypted permissions (P^P) and the public key of the 16 satellites ($PK_{Sat1}$, $PK_{Sat2}$, . . . $PK_{Sat16}$) to the customer 944. The customer 944 may send the encrypted permissions and the request to each assigned satellite 964 (Sat1), 966 (Sat2) to 968 (Sat16), encrypting the request with each satellite's public key ($PK_{Sati}$). The encrypted request may include instructions to capture one or more images from the parking lot 962 every time it passes over it, store and/or transmit the images to the customer 944. Each of the satellites 964 (Sat1), 966 (Sat2) to 968 (Sat16) may transmit raw data, metadata or analysis results to the customer 944. Additionally, since the satellites may have significant on-board processing capabilities, the request may include instructions to analyze the images, count the number of cars, and store or transmit the result of the analysis to the customer. The satellites may locate the parking lot because the satellites are capable of identifying land-use characteristics and, based on the characteristics, may determine the boundaries of the parking lot; and may count the number of cars because the satellites are capable of executing algorithms for detecting objects on the surface of the earth. Given that each satellite passes over the parking lot at different times throughout the day, the customer obtains the required data 24 hs a day. It should be noted that, as in previous examples, the messages may include authentication codes to verify integrity of the messages and identity of the users.

Figures 9B, 10:
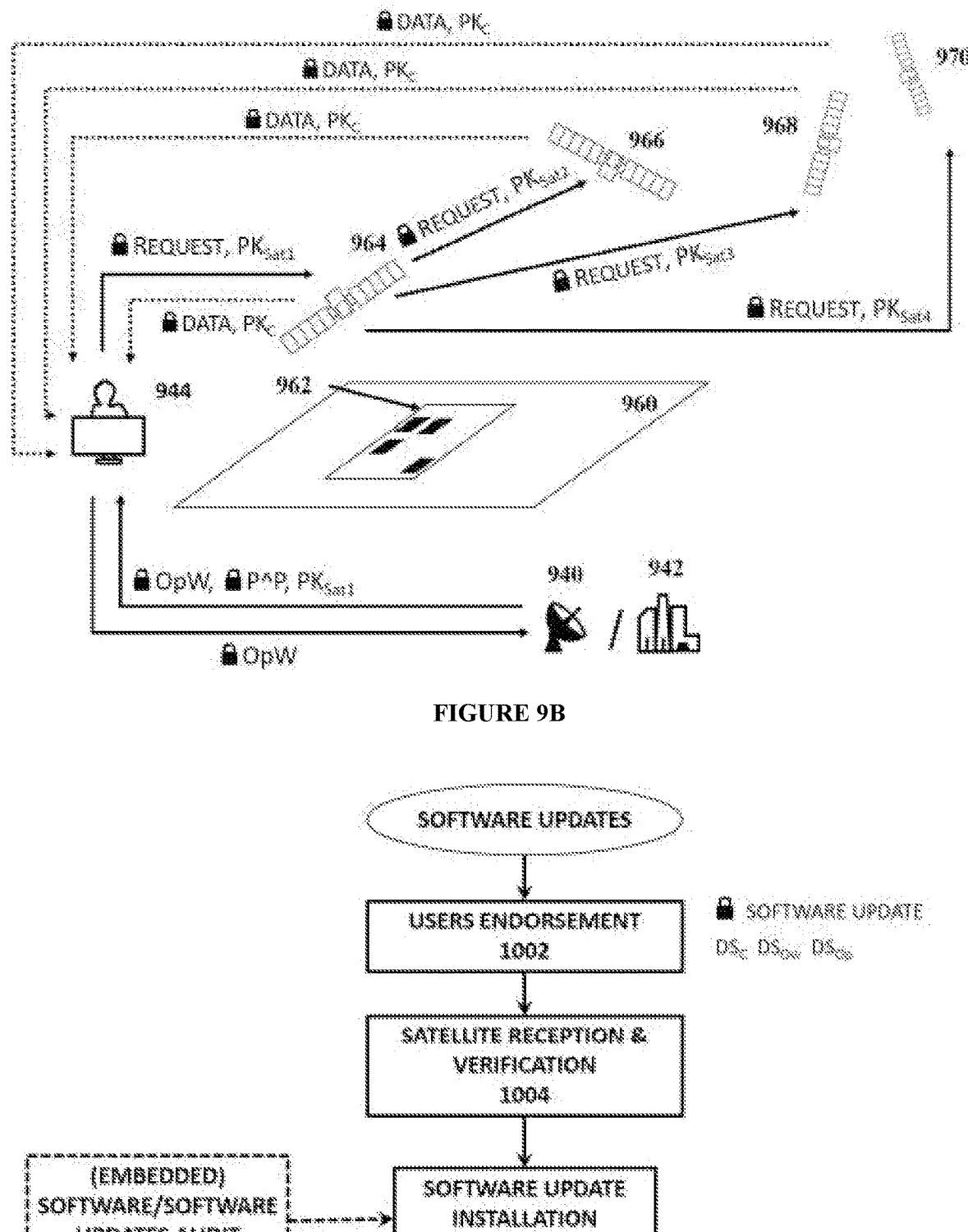
FIG. 10 illustrates an example flow diagram for updating the software in an orbiting satellite and for auditing software and/or software updates on-board the orbiting satellite, according to embodiments of present disclosure.

FIG. 9B illustrates another pictorial flow diagram for multiple satellite operations, according to embodiments of present disclosure. In some instances, the customer 944 may be assigned an operating window OpW which also includes the use of the resources of more than one satellite but, given that the satellites have a level of autonomous tasking, the customer receives the public key of only one satellite. Hence, the customer 944 may send the request to satellite 964 encrypting the request with the satellite's public key ($PK_{Sat1}$), and the satellite 964 receiving the encrypted request may make real-time decisions to either perform the task(s) included in the request or to task other satellites to perform one or more tasks, in order to optimize the execution of the task(s) included in the request. So the satellite 964 may send a request to satellite 966 including one or more tasks, encrypting the request with the public key of the satellite 966 ($PK_{Sat2}$). Hence, the satellite 966 may decrypt the request sent by the satellite 964 and perform the one or more tasks. Continuing with the previous example of the parking lot, based on the operating window requested by the customer 944, the owner 942 or operator 940 assigns the operating window OpW to the customer 944 by generating a description of permissions (P^P) comprising the exclusive use and control of one satellite 964 over the specified city 960 24 hs a day for one year, and sends the encrypted permissions (P^P) and the public key ($PK_{Sat1}$) of the assigned satellite 964 to the customer 944. The description of permissions may also comprise an authorization given to the assigned satellite 964 to task an unlimited number of satellites. The customer 944 may send requests to the assigned satellite 964, encrypted with the public key of the assigned satellite ($PK_{Sat1}$). The request may also include instructions to capture one or more images from the parking lot 962 every time it passes over it, analyze the images, count the number of cars, and store or transmit the images and/or the results of the analysis to the customer 944. Given that the assigned satellite 964 passes over the parking lot 962 at different times of the day and the customer 944 wants to obtain images continuously throughout the day without gaps of information, the satellite 964 may also task satellites 968 and 970 that belong to the constellation of satellites to capture images of the parking lot 962, so that every time the satellites 964, 966, 968 and 970 pass over the area of interest, the satellites capture images of the parking lot 962 and the customer 944 may obtain data (stored and/or transmitted) throughout the whole day. The assigned satellite 964 may task the satellite 966, 968 and 970 by sending a request with the public key of each of the satellites ($PK_{Sat2}$, $PK_{Sat3}$, $PK_{Sat4}$). The satellites 966, 968 and 970 may send the images or perform analysis and send the results to the assigned satellite 964, so the assigned satellite 964 may encrypt the data and send it to the customer 944. Additionally or alternatively, in some instances, the assigned satellite 964 may send instructions to satellites 966, 968 and 970 to encrypt the data 972 (including at least one of raw data, metadata or analysis results) with the public key of the customer ($PK_C$), and may instruct the satellites 966, 968 and 970 to directly send the encrypted data 972 to the customer 944. Additionally, the assigned satellite may detect if the view of the parking lot is partially obstructed for example by clouds, fog or dust, and may task a second satellite capable of performing pointing maneuvers to be orientated towards obstruction-free zones for optimizing the collection of images. Similarly, if the area of interest (i.e. the parking lot) is completely obstructed, the assigned satellite may task another satellite having a payload with a SAR sensor to capture images. Or, in cases in which the payload with the SAR sensor was not included in the operating window of the customer, the assigned satellite may autonomously task the payload with the SAR sensor to acquire images if determines that the area of interest is completely obstructed and the imaging payload with the optical sensor cannot perform the task.

FIG. 10 illustrates an example flow diagram for updating the programming instructions (software) in an orbiting satellite and for auditing the programming instructions (software and/or software updates) on-board the orbiting satellite, according to embodiments of present disclosure. Generally, the software updates may be embedded software updates (firmware updates) which are used to control the embedded systems of the satellite. Once the (embedded) software updates are determined on the ground, at 1002, the users of the satellite may endorse the (embedded) software updates to be sent to the orbiting satellite. For example, once the customers sharing the satellite resources learn about the embedded software updates, some (a predetermined number e.g. N out of M) or all of the customers may be required to sign the embedded software updates, to probe the customer's approval of the embedded software updates to be sent and implemented on-board the orbiting satellite. At 1004, the endorsed software updates are received and verified by the satellite. Upon receiving the embedded software updates, the satellite may verify the authenticity, authorizations as previously described, and in some instances may also verify user endorsements. At 1006, the software updates may be installed based on the user's decision. For example, some or all of the customers endorsing the embedded software updates may decide what version of the embedded software to run on its Customer on-board computer, in which case, embedded computers must be re-installed to the selected software version when the Customer on-board computer is started. In some implementations, the users may want to check what software is installed in the embedded computers, so at 1008, the users may audit the software, software updates, embedded software or embedded software updates, installed in their assigned on-board computers and/or in the embedded on-board computers. For example, after the Customer on-board computer is started a customer may ask for a cryptographic hash of the firmware or for portions of the firmware in a statistically significant way, to compare the results (or hashes of the portions) to the expected installed version of the software. The comparison could be performed on the ground or on-board the orbiting satellite.

According to some embodiments a private spacecraft or satellite tasking system comprises a satellite comprising computer-readable media, one or more sensors, and one or more on-board computers, the computer-readable media including one or more instructions, that when executed by the one or more on-board computers, cause the one or more on-board computers to perform acts comprising implementing cryptographic and security-in-depth techniques while in orbit; and administering satellite resources between one or more users, wherein each of the one or more users is assigned an operating window. The satellite may be part of a constellation of satellites. The user may comprise a space-based user or a ground-based user. The satellite may implement cryptographic and security-in-depth techniques with respect to one or more messages received from one or more users while the satellite is in orbit; may determine, based at least in part on the one or more messages, an operating window for a user of the one or more users; and may assign, based at least in part on the operating window, one or more satellite resources to the user. The satellite may also implement cryptographic and security-in-depth techniques with respect to one or more additional messages transmitted by the satellite that is in orbit to the one or more users. In some instances, the on-board computers may be configured to assign a first satellite resource to a first user of the one or more users and a second satellite resource to a second user of the one or more users; and may assign a first operating window to the first user and a second operating window to the second user.

Embodiments also include implementing cryptographic and security-in-depth techniques to the one or more messages received by the satellite or to one or more additional messages transmitted from the satellite to the one or more users, the cryptographic and security-in-depth techniques comprising at least one of encrypting the one or more messages or the one or more additional messages, decrypting the one or more messages or the one or more additional messages, sealing the one or more messages or the one or more additional messages, unsealing the one or more messages or the one or more additional messages, verifying an integrity of the one or more messages or the one or more additional messages, the authenticating of the identity of the one or more users, virtualization, software or hardware isolation, compartmentalization, access control, resource allocation, or generation, use and verification of authentication data; wherein the one or more messages comprise at least one of cryptographic keys, requests, tasks, or instructions, and the one or more additional messages comprise at least one of metadata or satellite data.

The operating window may be determined by defining one or more of a period of time, a geographical area, an extent in space, a number of satellites, a resource allotment, or any combination of these. At least one on-board computer may be assigned to the user and/or a user profile associated with the user, and the on-board computer may be at least one of a physical machine, a virtual machine, a full virtual machine, a lightweight virtual machine, an operating system user profile and a capabilities configuration setting, or an application container. The one or more on-board computers may be configured to persist their state and save or discard the status to be carried from execution to execution, or may be configured to be stateless and rely on an external mechanism to load all required configuration and parameters.

The satellite resource(s) of the satellite or of at least one satellite of a constellation of satellites may comprise hardware and software resources including at least one of payload systems, application containers, virtual on-board computers, physical on-board computers, satellite modules, operating windows, satellite tasks, requests, tasking requests, data requests, storage, the one or more sensors of the satellite, supplies used by a space-based manufacturing facility, data or information that is stored, collected or processed, upload or download bandwidth capacity, or cryptographic operations. The computer-readable media may store a list of tasks for the satellite to complete, and the satellite may create and/or reprioritize tasks, based at least in part on permissions and operating windows assigned to the one or more users. The system may implement obfuscation processes in order to set the global satellite state or a satellite resource state in a chosen configuration, before releasing the satellite or the one or more satellite resources from the user to a second user of the one or more users, and/or may implement remote attestation protocols to show that the on-board software and hardware have not changed from a known and accepted state by any of the one or more users.

The private spacecraft or satellite tasking system may generate a cryptographic key and may distribute the cryptographic key to one or more users. The cryptographic key may comprise a public portion and a private portion; wherein the private portion of the cryptographic key may be stored in the satellite and the public portion of the cryptographic key may be distributed to the one or more users. The cryptographic and security-in-depth techniques may comprise at least one of encrypting the one or more messages, decrypting the one or more messages, sealing the one or more messages, unsealing the one or more messages, verifying an integrity of the one or more messages, authenticating an identity of the one or more users, virtualization, software or hardware isolation, compartmentalization, access control, resource allocation, or generation, use and verification of authentication data; wherein the one or more messages comprise at least one of cryptographic keys, requests, tasks, instructions, metadata, or satellite data. The one or more messages received by the system may comprise a set of permissions assigned to the user. The system may determine, based on a set of permissions, the amount and manner of satellite resources assigned to each of the one or more users. The system may assign, based at least in part on the set of permissions, at least one of the one or more satellite resources, one or more satellites of a constellation of satellites, or one or more additional satellite resources of the one or more satellites, to the user. The acts performed by the on-board computer may further associate the set of permissions to the user and may determine, based on the set of permissions associated to the user, a subset of permissions granted to one or more sub-users of the user.

The satellites of the system may receive the set of permissions assigned from a first user to a second user, wherein the set of permissions comprises an authentication code, may determine, based at least in part on the authentication code, the validity and legitimacy of the permissions and the identity of the first user authorizing the set of permissions and may associate the set of permissions to the identity of the second user. The satellites of the system may further receive a message comprising the set of permissions and a request, comprising a second authentication code, and may determine, based on the second authentication code, the identity of the second user. The set of permissions may comprise a chain of permissions or delegated permissions comprising at least one authentication code, and the satellite may determine the validity and/or legitimacy of the delegated permissions assigned to sub-users of the satellite, based on the at least one authentication code. For example, a first user (e.g. Owner or Operator) may generate a set of permissions granted to a second user (e.g. Customer) and may add an authentication code so the satellite, after receiving the authentication code (sent either by the first or second user), may determine the satellite resources to be assigned to the second user. The authentication code may comprise a tag or a signature based on the private portion of a cryptographic key. The first user may also include in the permissions an authorization to delegate permissions to one or more third users. So, when the one or more third users send a requests to the satellite, they add an additional authentication code belonging to the second user, so that the satellite may determine, based on the authentication code belonging to the second user and the set of permission assigned to the second user, whether or not the second user has authorization to delegate permissions to the one or more third users. If the set of permissions include delegating permissions, the satellite may determine, also based on the set of permission assigned to the second user, the satellite resources to be assigned to the one or more third users.

The message received by the satellite comprising the set of permissions, a request and/or an authentication code may be encrypted, and the acts of the satellite further comprises decrypting the encrypted request as a decrypted request, determining, based at least in part on the decrypted request, one or more tasks to perform; and performing, based at least in part on a set of permissions and on the operating windows, the one or more tasks. The one or more tasks may comprise capturing payload data; encrypting the payload data as encrypted payload data; linking a cryptographic key to the encrypted payload data; and transmitting the encrypted payload data linked to the cryptographic key to the user. The satellite may further analyze the payload data to generate analysis results; encrypt the analysis results as encrypted analysis results; link a cryptographic key to the encrypted analysis results; and transmit the encrypted analysis results linked to the cryptographic key to the user. In some instances, the payload data optionally comprises satellite data captured by one or more satellites of a constellation of satellites.

According to other exemplary embodiments, a method under control of one or more processors in a satellite comprises the steps of generating a cryptographic key; and distributing the cryptographic key to one or more users. The method may comprise receiving one or more messages from one or more users while the satellite is in orbit; verifying an integrity of the one or more messages; authenticating an identity of the one or more users; determining, based at least in part on the one or more messages, an operating window for a user of the one or more users; and assigning, based at least in part on the operating window, one or more satellite resources to the user. In some instances, the one or more messages are encrypted and comprise a set of permissions, and the method further comprises decrypting the one or more messages; and determining, based at least in part on the set of permissions, resources to be assigned to the one or more users or one or more tasks to be performed by the satellite.

In some instances, the cryptographic key may be generated by the owner of the satellite and may be uploaded to the satellite before being launched. The steps may further comprise receiving an encrypted message sent by one or more users, wherein the message comprises a set of permissions and an authentication code, and the message is encrypted with the cryptographic key; decrypting the encrypted message; determining, based at least in part on the authentication code, an integrity of the message and an identity of the one or more users; and determining, based at least in part on the set of permissions, the resources to be assigned to the one or more users. The encrypted message may further comprise a request comprising one or more tasks to be performed by the orbiting satellite and the steps may comprise determining, based at least in part on the set of permissions, the one or more tasks authorized to be performed; and performing the one or more tasks. The one or more tasks may comprise at least one of capturing raw satellite data, processing raw satellite data as processed satellite data, analyzing at least one of processed satellite data, satellite data captured by the satellite or by a second satellite of a constellation of satellites to generate analysis results; encrypting message, the message including raw satellite data, analysis results, and/or metadata; or transmitting the encrypted message to the user. The step of processing raw satellite data and/or analyzing the satellite data may be shared between the satellite and one or more satellites of the constellation of satellites, or between the satellite and a ground-based station. The encrypted message may further comprise information or data to be used by the satellite to perform one or more tasks. The method may further comprise encrypting one or more additional messages comprising at least one of the raw satellite data, the processed satellite data, the analysis results or metadata to generate encrypted one or more messages; and transmitting the encrypted one or more messages to the one or more users

CONCLUSION

Although the disclosure uses language that is specific to structural features and/or methodological acts, the invention is not limited to the specific features or acts described. Rather, the specific features and acts are disclosed as illustrative forms of implementing the invention.

What is claimed is:

1. A private satellite tasking system comprising:

a satellite comprising computer-readable media, one or more sensors, and one or more on-board computers;

one or more application programming interfaces on-board the satellite configured to expose satellite resources to the one or more on-board computers; and a programming interface broker on-board the satellite configured to authenticate and authorize the one or more application programming interfaces;

the computer-readable media including one or more instructions, that when executed by the one or more on-board computers, cause the one or more on-board computers to perform acts comprising:

determining, by the programming interface broker, permissions granted to a user of one or more users;

assigning, based at least in part on the permissions, a user on-board computer of the one or more on-board computers to each of the one or more users or each user profile associated with each of the one or more users;

determining, based at least in part on the permissions, one or more satellite resources of the satellite to assign to the user on-board computer; and assigning, based at least in part on the permissions, at least one application programming interface of the one or more application programming interfaces to the user on-board computer to expose the one or more satellite resources of the satellite to the user on-board computer to provide an exclusive operative control of the one or more satellite resources of the satellite to the user on-board computer, for an extent of an operating window assigned to each of the one or more users;

wherein the at least one application programming interface of the one or more application programming interfaces is configured to implement cryptographic and security-in-depth techniques with respect to one or more messages received from and/or transmitted to one or more users while the satellite is in orbit.

2. The system of claim 1, wherein the acts further comprise determining, based at least in part on the one or more messages, the operating window for the user, and assigning the one or more satellite resources to the user based at least in part on the operating window, wherein the operating window is further determined by defining one or more of a period of time, a geographical area, an extent in space, a number of satellites, a resource allotment, or any combination of these.

3. The system of claim 2, wherein the one or more messages comprise signed and/or encrypted request and implementing the cryptographic and security-in-depth techniques comprises the steps executed by at least one of the one or more on-board computers of:

verifying an integrity of the one or more messages;
authenticating an identity of the one or more users; and/or
decrypting the encrypted request as a decrypted request;
and the acts further comprise:
determining, based at least in part on the decrypted request, one or more tasks to perform; and
performing, based at least in part on the permissions and on the operating window, the one or more tasks.

4. The system of claim 3, wherein the one or more tasks comprises:

capturing payload data;
encrypting and/or signing the payload data as encrypted and/or signed payload data; and
transmitting the encrypted and/or signed payload data to the user.

5. The system of claim 4, wherein the acts further comprise:

analyzing the payload data to generate analysis results;
encrypting and/or signing the analysis results as encrypted and/or signed analysis results; and
transmitting the encrypted and/or signed analysis results to the user;
wherein the payload data comprises satellite data captured by the satellite or by one or more satellites of a constellation of satellites.

6. The system of claim 1, wherein the user on-board computer is at least one of a physical machine, a virtual machine, a full virtual machine, a lightweight virtual machine, an operating system user profile, a capabilities configuration setting, or an application container.

7. The system of claim 1, wherein the user on-board computer is a first user onboard computer configured to persist its state and save or discard its status to be carried from execution to execution before handing in the one or more satellite resources to a second user on-board computer, or is configured to be stateless and rely on an external mechanism to load configurations and parameters before handing in the one or more satellite resources to a second user on-board computer.

8. The system of claim 1, wherein the one or more satellite resources comprise hardware and software resources including at least one of payload systems, application containers, virtual on-board computers, physical on-board computers, satellite modules, operating windows, satellite tasks, requests, tasking requests, data requests, storage, the one or more sensors, supplies used by a space-based manufacturing facility, data or information that is stored, collected or processed, upload or download bandwidth capacity, or cryptographic operations.

9. The system of claim 1, wherein the acts further comprise:

implementing obfuscation processes by setting a global satellite state or a satellite resource state in a configuration configured to impede collecting or accessing data or metadata derived or generated from the use of the satellite or the one or more satellite resources by the user on-board computer before releasing the satellite or the one or more satellite resources from the user on-board computer to a second user on-board computer.

10. The system of claim 1, wherein the acts further comprise:

implementing remote attestation protocols by showing that software on board the satellite has not been changed, by any user on-board computer, to a state different from a known and accepted state.

11. The system of claim 1, wherein implementing the cryptographic and security-in-depth techniques comprises:

generating, by the satellite, a cryptographic key; and
distributing the cryptographic key to the one or more users.

12. The system of claim 11, wherein the cryptographic key comprises a public portion and a private portion; and wherein the private portion of the cryptographic key is stored in the satellite and the public portion of the cryptographic key is distributed to the one or more users.

13. The system of claim 1, wherein the cryptographic and security-in-depth techniques comprise at least one of encrypting the one or more messages, decrypting the one or more messages, sealing the one or more messages, unsealing the one or more messages, verifying an integrity of the one or more messages, authenticating an identity of the one or more users, virtualization, software or hardware isolation, compartmentalization, access control, resource allocation, or generation, use and verification of authentication data; wherein the one or more messages comprise at least one of cryptographic keys, requests, tasks, instructions, metadata, or satellite data.

14. The system of claim 1, wherein the permissions are included in the one or more messages, and comprise a set of permissions assigned to the user, and the acts further comprise:

assigning, based at least in part on the set of permissions, at least one of the one or more satellite resources, one or more satellites of a constellation of satellites, or one or more additional satellite resources of the one or more satellites, to the user on-board computer, and/or storing the set of permissions to be used at a later time.

15. A method under control of one or more processors in a satellite, the method comprising:

receiving and/or transmitting one or more messages from and/or to one or more users while the satellite is in orbit;

implementing, by a first application programming interface, cryptographic and security-in-depth techniques with respect to the one or more messages received from and/or transmitted to the one or more users while the satellite is in orbit;

generating by a programming interface broker, based on received and/or stored permissions, a description of permissions and privileges associated with each of the one or more users;

assigning, based at least in part on the description, a user onboard computer to each of the one or more users or user profiles associated with each of the one or more users;

determining, based at least in part on the description, one or more satellite resources of the satellite to assign to a user on-board computer; and assigning, based at least in part on the description, one or more second application programming interfaces to the user on-board computer to expose the one or more satellite resources of the satellite to the user on-board computer to provide an exclusive operative control of the one or more satellite resources of the satellite to the user on-board computer, for an extent of an operating window assigned to each of the one or more users.

16. The method of claim 15, further comprising determining, based at least in part on the one or more messages, the operating window for the user on-board computer, and further assigning the one or more satellite resources to the user on-board computer based at least in part on the operating window, wherein the operating window is further determined by defining one or more of a period of time, a geographical area, an extent in space, a number of satellites, a resource allotment, or any combination of these.

17. The method of claim 16, wherein implementing the cryptographic and security-in-depth techniques comprises:

verifying an integrity of the one or more messages;

authenticating an identity of the one or more users; and the method further comprises:

determining the operating window for the user on-board computer based at least in part on the one or more messages.

18. The method of claim 15, wherein the one or more messages are encrypted, wherein the permissions are included in the one or more messages and comprise a set of permissions, and implementing the cryptographic and security-in-depth techniques comprises:

decrypting the one or more messages; and determining, based at least in part on the set of permissions, the one or more satellite resources to be assigned to the one or more users or one or more tasks to be performed by the satellite.

19. The method of claim 18, further comprising:

encrypting and/or signing one or more additional messages comprising at least one of raw satellite data, processed satellite data, analysis results or metadata to generate encrypted and/or signed one or more messages; and transmitting the encrypted and/or signed one or more messages to the one or more users.

20. The method of claim 15, wherein implementing the cryptographic and security-in-depth techniques comprises:

generating a cryptographic key;

distributing the cryptographic key to the one or more users; and receiving an encrypted message sent by the one or more users, wherein the encrypted message is encrypted with the cryptographic key.

\* \* \* \* \*